US00RE47022E

(19) United States
(12) Reissued Patent
Sosnovsky et al.

(10) Patent Number: US RE47,022 E
(45) Date of Reissued Patent: Sep. 4, 2018

(54) CONTAINER

(71) Applicant: THE STANLEY WORKS ISRAEL LTD., Rosh Ha'Ayin (IL)

(72) Inventors: David Sosnovsky, Tel Aviv (IL); Mark Bensman, Rosh Ha'Ayin (IL)

(73) Assignee: The Stanley Works Israel Ltd., Rosh Ha'Ayin (IL)

(21) Appl. No.: 14/819,916

(22) Filed: Aug. 6, 2015

Related U.S. Patent Documents

Reissue of:
(64) Patent No.: 8,505,729
Issued: Aug. 13, 2013
Appl. No.: 12/954,125
Filed: Nov. 24, 2010

U.S. Applications:
(63) Continuation-in-part of application No. 12/636,139, filed on Dec. 11, 2009, now abandoned.

(51) Int. Cl.
*B65D 21/00* (2006.01)
*B65D 21/02* (2006.01)
(Continued)

(52) U.S. Cl.
CPC ..... *B65D 21/0228* (2013.01); *B25H 3/021* (2013.01); *B65D 45/22* (2013.01)

(58) Field of Classification Search
CPC .... B65D 21/0228; B65D 45/22; B65D 45/20; B25H 3/021
See application file for complete search history.

(56) References Cited

U.S. PATENT DOCUMENTS 344,661 A 6/1886 Kistler
687,619 A 11/1901 Couse
(Continued)

FOREIGN PATENT DOCUMENTS

DE 42 01 264 7/1993
DE 29900062 U1 4/1999
(Continued)

OTHER PUBLICATIONS

English translation of foreign reference DE 10 2007 032 382 A1, issued to inventors Marco Alessandro Piacenza et al., published Jan. 17, 2008, translated by Schrieber Translations, Inc., Feb. 2016.*
(Continued)

*Primary Examiner* — Jeffrey L Gellner
(74) *Attorney, Agent, or Firm* — Pillsbury Winthrop Shaw Pittman LLP

(57) ABSTRACT

A container constructed and arranged to be connected to at least one other container. The container has a container portion, a cover, and a latch member movable between a first position and a second position. A retaining member on the container portion is engageable with the latch member. In the first position, the latch member engages the retaining member to inhibit movement of the latch member away from the first position. In the second position, the latch member is engageable with a container portion of the other container to connect the containers. The latch member is pivotally movable in a clockwise and counterclockwise manner. The latch member can be pivoted upwards to the second position to engage the other container and the latch member can be pivoted downwards to the first position to engage the retaining member to inhibit movement of the latch member away from the first position.

38 Claims, 12 Drawing Sheets

(51) Int. Cl.
*B65D 45/22* (2006.01)
*B25H 3/02* (2006.01)

(56) References Cited

U.S. PATENT DOCUMENTS 1,424,819 A 8/1922 Hayes et al.
1,933,894 A 11/1933 Clink
2,554,091 A 5/1951 Davis
2,588,830 A 3/1952 Haanstad
2,901,262 A 8/1959 Berlin
2,964,328 A 12/1960 Muir
3,168,329 A 2/1965 Goldschmidt
3,310,905 A 3/1967 Davis et al.
3,327,841 A 6/1967 Schurman et al.
3,393,951 A 7/1968 Sulentic
3,734,526 A 5/1973 Propst et al.
3,804,432 A 4/1974 Lehrman
3,891,230 A 6/1975 Mayer
3,990,653 A 11/1976 Marcell
4,169,607 A 10/1979 Reese
4,202,459 A * 5/1980 DeParales ..... B65D 43/0218 220/254.3
4,363,496 A 12/1982 Schreiner
4,448,434 A 5/1984 Anderson
4,619,363 A 10/1986 Wolfseder
4,836,374 A 6/1989 Hutchins et al.
4,884,689 A 12/1989 Su-Chin
4,927,021 A 5/1990 Taylor
4,936,594 A 6/1990 Oliver, III
4,984,704 A 1/1991 O'Malley
5,022,546 A 6/1991 Bock
5,104,135 A 4/1992 Sheets
5,123,666 A 6/1992 Moore
5,207,723 A 5/1993 Newby, Sr.
5,325,966 A 7/1994 Chang
5,333,885 A 8/1994 Pullman
5,362,078 A 11/1994 Paton
5,378,005 A 1/1995 Norton
5,464,104 A 11/1995 McArthur
5,474,312 A 12/1995 Starita et al.
5,595,395 A 1/1997 Wilson
5,626,352 A 5/1997 Grace
5,634,649 A 6/1997 Breining et al.
5,699,925 A 12/1997 Petruzzi
5,720,535 A 2/1998 Mehman
5,799,958 A 9/1998 Bishop
5,803,254 A 9/1998 Vasudeva
5,845,915 A 12/1998 Wilson
5,882,097 A 3/1999 Kohagen et al.
5,887,715 A 3/1999 Vasudeva
5,906,381 A 5/1999 Hovatter
5,913,527 A 6/1999 Hailston
5,915,554 A 6/1999 Hung
5,931,483 A 8/1999 Haynes
5,934,466 A 8/1999 Loeffler
5,938,396 A 8/1999 Audet
D417,338 S 12/1999 Main
6,000,713 A 12/1999 Lin
6,015,064 A 1/2000 Liu
6,050,660 A 4/2000 Gurley
6,079,719 A 6/2000 Tisbo et al.
6,082,539 A 7/2000 Lee
6,105,767 A 8/2000 Vasudeva
6,109,627 A 8/2000 Be
6,113,129 A 9/2000 Marques et al.
6,123,344 A 9/2000 Clegg
6,131,926 A 10/2000 Harlan
6,135,466 A 10/2000 Irwin
6,176,559 B1 1/2001 Tiramani et al.
D437,484 S 2/2001 Tiramani et al.
6,254,112 B1 7/2001 Clegg
6,347,847 B1 2/2002 Tiramani et al.
6,357,063 B1 3/2002 Selby
6,371,320 B2 4/2002 Sagol
6,394,471 B1 5/2002 Watson
6,398,235 B1 6/2002 Cary
6,474,930 B1 11/2002 Simpson
6,523,687 B2 2/2003 Ling
6,561,528 B2 5/2003 Bootsman
6,601,930 B2 8/2003 Tiramani et al.
6,616,152 B2 9/2003 Oliver
6,626,295 B1 9/2003 Vasudeva
6,648,166 B2 11/2003 Levy
6,648,390 B1 * 11/2003 Yang ..... A47B 49/00 206/821
6,659,476 B2 12/2003 Weida
6,666,465 B2 12/2003 Chan
6,874,634 B2 * 4/2005 Riley ..... A61L 2/26 206/370
6,889,838 B2 5/2005 Meier et al. ..... B25H 3/021 206/508
6,945,546 B2 9/2005 Guirlinger
6,971,517 B2 12/2005 Chen
6,994,214 B2 2/2006 Yang
7,063,339 B2 6/2006 Jarko et al.
7,066,475 B2 6/2006 Barnes
7,108,131 B2 9/2006 Dreher
7,168,715 B1 1/2007 Friedman
D536,525 S 2/2007 Vasudeva et al.
7,188,846 B2 3/2007 Deavila
7,188,847 B1 3/2007 Friedman
D542,496 S 5/2007 Sabbag
7,210,689 B2 5/2007 Guirlinger
7,219,969 B2 5/2007 Bezzubov
7,246,704 B2 7/2007 Brunson et al.
7,255,229 B2 8/2007 Roesler
7,263,742 B2 9/2007 Valentini
7,328,905 B2 2/2008 Guirlinger
7,334,680 B2 2/2008 Cunningham et al.
7,357,268 B2 4/2008 Yang
7,367,571 B1 5/2008 Nichols
7,472,730 B2 1/2009 Adkins
7,500,681 B2 3/2009 Steadman
7,503,569 B2 3/2009 Duvigneau
7,523,827 B2 4/2009 Dane et al.
7,686,260 B1 3/2010 Tetradis
7,703,776 B1 4/2010 Nugent
7,819,407 B1 10/2010 Charitun
7,823,893 B2 11/2010 Meyers et al.
7,845,653 B2 12/2010 Katz
7,883,096 B2 2/2011 Katz et al.
7,905,353 B2 * 3/2011 Baker ..... B65D 1/28 206/370
7,905,502 B2 3/2011 Oliver
7,938,412 B2 5/2011 Katz
D640,869 S 7/2011 Katz et al.
D653,832 S 2/2012 Vilkomirski et al.
D654,241 S 2/2012 Vilkomirski et al.
8,132,819 B2 3/2012 Landau et al.
8,226,092 B2 7/2012 Oliver
8,505,729 B2 8/2013 Sosnovsky et al.
8,567,796 B2 10/2013 Bar-Erez et al.
8,657,307 B2 2/2014 Lifshitz et al.
8,668,209 B1 3/2014 Anzivino et al.
9,132,543 B2 9/2015 Bar-Erez et al.
9,566,990 B2 2/2017 Bar-Erez et al.
2001/0052681 A1 12/2001 Deavila
2002/0014488 A1 2/2002 Schermel
2002/0067027 A1 6/2002 Anderson
2002/0074905 A1 6/2002 Tiramani et al.
2002/0113386 A1 8/2002 Be
2002/0185831 A1 12/2002 Chan
2003/0001348 A1 1/2003 Weida
2003/0146589 A1 8/2003 Jarko et al.
2004/0069668 A1 4/2004 Finnigan
2004/0265104 A1 12/2004 Davis, Jr.
2005/0062244 A1 3/2005 Guirlinger
2005/0104308 A1 5/2005 Barnes
2005/0161357 A1 7/2005 Allan et al.
2005/0224384 A1 10/2005 Sands et al.
2005/0258610 A1 11/2005 Stone et al.
2005/0275178 A1 12/2005 Huesdash et al.
2006/0006619 A1 1/2006 Guirlinger
2006/0012139 A1 1/2006 Guirlinger

(56) References Cited

U.S. PATENT DOCUMENTS

| | | | | |
|---|---|---|---|---|
| 2006/0037964 | A1 | 2/2006 | Su | |
| 2006/0038367 | A9 | 2/2006 | Ferraro et al. | |
| 2007/0080512 | A1 | 4/2007 | Bartholmey et al. | |
| 2007/0103039 | A1 | 5/2007 | Holcomb et al. | |
| 2007/0194024 | A1 | 8/2007 | Liaw | |
| 2007/0194543 | A1 | 8/2007 | Duvigneau | |
| 2007/0273114 | A1 | 11/2007 | Katz | |
| 2008/0084036 | A1 | 4/2008 | Keeler | |
| 2008/0121547 | A1 | 5/2008 | Dur et al. | |
| 2008/0128305 | A1 | 6/2008 | Guirlinger | |
| 2008/0143069 | A1 | 6/2008 | Richards et al. | |
| 2009/0020528 | A1 | 1/2009 | Chang | |
| 2009/0026901 | A1 | 1/2009 | Nies, III et al. | |
| 2009/0096181 | A1 | 4/2009 | Cole et al. | |
| 2009/0223853 | A1* | 9/2009 | Kim | B65D 45/22 206/509 |
| 2009/0236255 | A1 | 9/2009 | Piacenza | |
| 2009/0309323 | A1 | 12/2009 | Oliver | |
| 2010/0052276 | A1 | 3/2010 | Brunner | |
| 2010/0290877 | A1 | 11/2010 | Landau et al. | |
| 2010/0327562 | A1 | 12/2010 | Kasuya et al. | |
| 2011/0049824 | A1 | 3/2011 | Bar-Erez et al. | |
| 2011/0181008 | A1 | 7/2011 | Bensman et al. | |
| 2012/0160886 | A1 | 6/2012 | Henny et al. | |
| 2012/0326406 | A1 | 12/2012 | Lifshitz et al. | |
| 2014/0001719 | A1 | 1/2014 | Bar-Erez et al. | |
| 2014/0023221 | A1 | 1/2014 | Weinstein | |
| 2014/0375181 | A1 | 12/2014 | Bar-Erez et al. | |

FOREIGN PATENT DOCUMENTS

| | | | |
|---|---|---|---|
| DE | 29900082 | U1 | 4/1999 |
| DE | 20104108 | U1 | 6/2001 |
| DE | 102007032382 | A1 | 1/2008 |
| EP | 0 555 533 | | 8/1994 |
| EP | 1 424 170 | | 6/2004 |
| EP | 1 859 908 | | 11/2007 |
| GB | 2 235 165 | | 9/2006 |
| WO | WO 02/11955 | A1 | 2/2002 |

OTHER PUBLICATIONS

Stanley 20602Z Metal Rolling Workshop [online]. Retrieved from the Internet: <URL: http://www.amazon.com/Stanley-20602Z-Metal-Rolling-Workshop/dp/B00005QVQT>.

Stanley Rolling Workshop [online]. Retrieved from the Internet: <URL: http://www.machinemart.co.uk/shop/product/details/rolling-workshop/path/tool-boxes-tool-bags-organisers>.

Stanley FatMax® 4-in-1 Mobile Work Station (020800R) [online]. Retrieved from the Internet: <URL: http://www.stanleytools.com/default.asp?CATEGORY=TOOLBOXES&TYPE=PRODUCT&PARTNUMBER=020800R&SDesc=FatMax%26%23174%3B+4-in-1+Mobile+Work+Station>.

Extended Search Report as issued for European Patent Application No. 10174339.1, dated May 27, 2011.

Northern Tool Mobile Workshop and Toolbox—Model# 75-2050 [online]. Retrieved from the Internet: <URL: http://www.northerntool.com/webapp/wcs/stores/servlet/product_6970_200382275_200382275>.

Duratool Rolling Tool Organizer and Rolling Workshop [online]. Retrieved from the Internet: <URL: http://www.amazon.com/s?ie=UTF8&search-alias=tools&field-brandtextbin=Duratool>.

Non-Final Office Action dated Sep. 9, 2016 in corresponding U.S. Appl. No. 14/830,304 (8 pages).

Extended Search Report as issued for European Patent Application No. 10193990.8, dated Jun. 16, 2011.

* cited by examiner

CONTAINER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a container storage system, and more particularly, to a container storage system having containers that can be connected together.

BACKGROUND OF THE INVENTION

Numerous container storage systems are known in the art. However, there is a constant need in the industry to improve upon existing container storage systems by making them more efficient, easy to use, modular, and/or multifunctional.

SUMMARY OF THE INVENTION

One aspect provides a container constructed and arranged to be connected to at least one other container. The container has a container portion with an opening into an interior space in which articles to be transported can be stored and a cover for closing the opening. The container also includes a latch member movable between a first position and a second position. A retaining member on the container portion is constructed and arranged to engage with the latch member. In the first position, the latch member engages the retaining member to inhibit movement of the latch member away from the first position. The latch member, when in the second position, is positioned to be able to engage with a container portion of the at least one other container to connect the container to the at least one other container. The latch member is pivotally movable in a clockwise and counterclockwise manner. The latch member can be pivoted upwards to the second position to engage the container portion of the at least one other container and the latch member can be pivoted downwards to the first position to engage the retaining member to inhibit movement of the latch member away from the first position.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1:
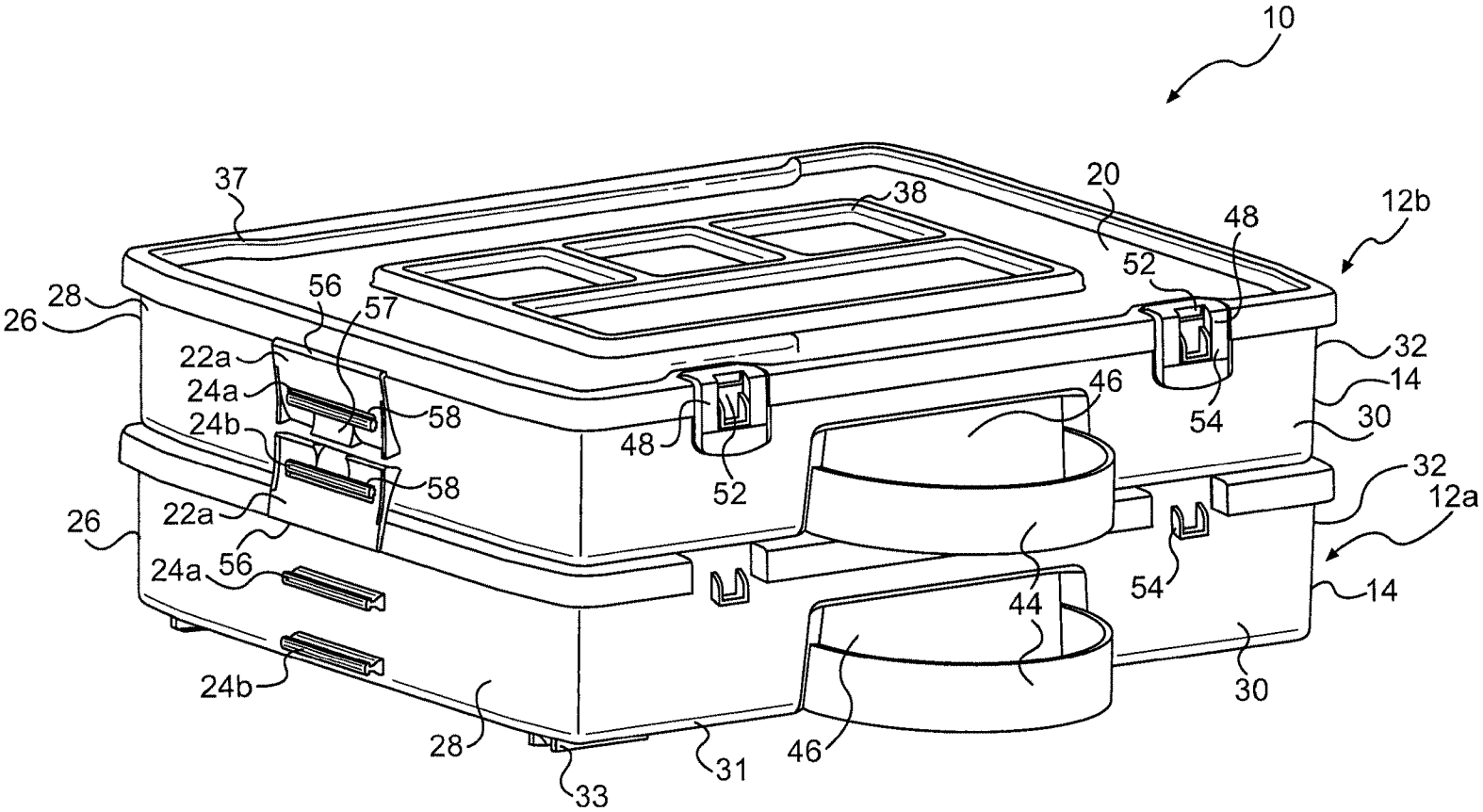
FIG. 1 is a perspective front view of a container storage assembly in accordance with an embodiment of the present invention.
Figure 4:
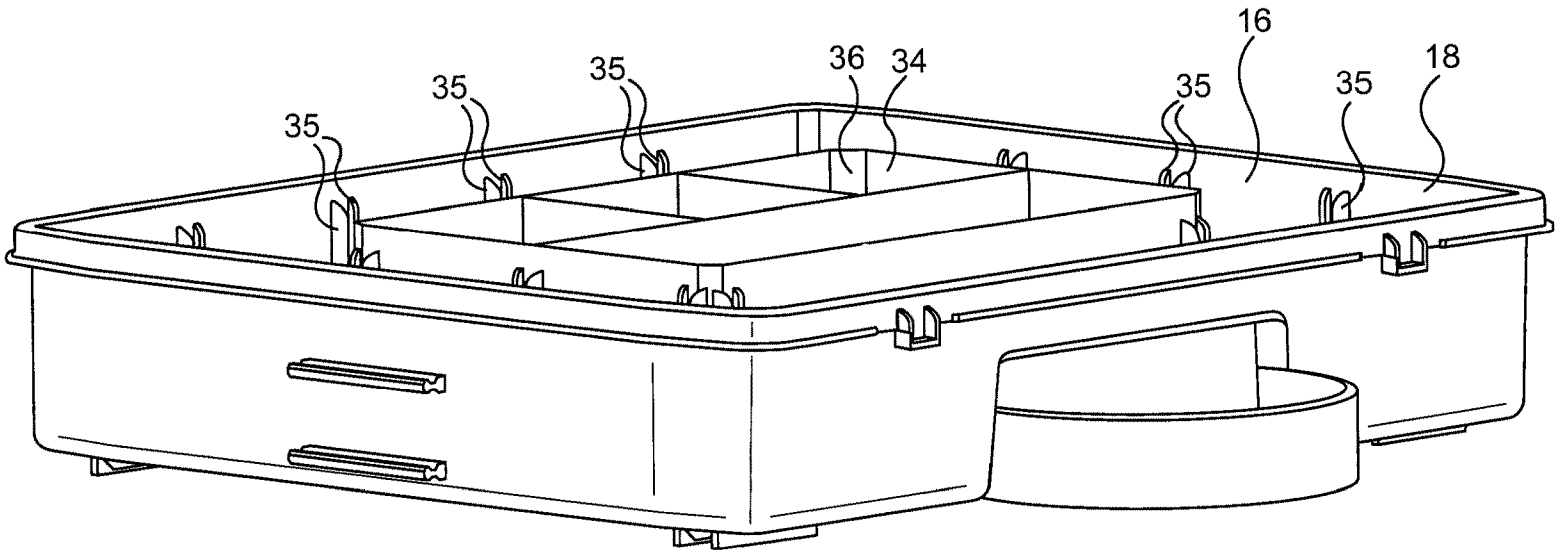
FIG. 4 is a perspective front view of a container of the container storage assembly in accordance with the embodiment of FIG. 1.

FIG. 1 shows a container storage system 10 that includes a plurality of containers 12a, 12b constructed and arranged to be connected together. Each container 12a or 12b has a container portion 14 with an opening 16 (see FIG. 4) into an interior space 18 in which articles to be transported can be stored. Each container 12a or 12b also includes a cover 20 for closing the opening and a latch member 22a that is moveable between a first position and a second position. Each container 12a or 12b also has a retaining member or latch receiving portion 24a or 24b constructed and arranged to engage with the latch member 22a. In the first position, the latch member 22a engages the retaining member 24b to inhibit movement of the latch member away from the first position. In the second position, the latch member 22a of a first of the containers 12a engages with a second of the containers 12b to connect the first container 12a to the second container 12b. Although FIG. 1 only shows two containers 12a and 12b of the container storage system 10, additional containers that are constructed and arranged similarly to containers 12a and 12b may be connected to containers 12a and 12b. It is also contemplated that additional containers constructed and arranged differently from containers 12a and 12b may be connected to containers 12a and 12b. The containers 12a and 12b are generally rectangular in shape. However, any convenient shape may be used.

As shown in FIG. 1, the interior space 18 (see FIG. 4) of the container portion 14 of each container 12a and 12b may be defined by a back wall or side 26, a left wall or side 28, a front wall or side 30, a bottom wall or side 31, and a right wall or side 32. The interior space 18 may include dividers or inserts 34 (see FIG. 4) constructed and arranged to divide the interior space into compartments 36. The dividers 34 may be constructed and arranged to be optionally removable by the user so that the user can insert the dividers 34 at various positions to form various sized compartments. The interior space 18 may also include pairs of flanges 35 (see FIG. 4) constructed and arranged to extend from the back wall 26, the left wall 28, the front wall 30, and the right wall 32 at different angles so as to form a V shape. The flanges 35 may have the same height as the dividers 34, or may be of a greater or smaller height. The flanges 35 may be constructed and arranged to receive ribs (not shown) on the dividers 34. In one embodiment, the dividers 34 form the side walls of boxes or container members with open tops that can be inserted into the container portion 14. As such, these containers or boxes formed by the dividers 34 may have ribs along their edges, wherein the ribs may be inserted into these flanges 35 so as to retain the containers or boxes within the container portion 14. These containers or boxes formed by the dividers 34 may be used to carry items, such as, for example, nails, screws, or other small items. It is also contemplated that these containers or boxes may be removed from the containers 12a, 12b to be carried separately. The container portion 14 may be made of plastic, metal, wood, other materials, or a combination thereof. The containers 12a and 12b may have feet 33 attached to the bottom wall 31 that are constructed and arranged to engage a surface. The feet 33 may be made of plastic, rubber, or other materials to provide friction with the surface on which the container 12a or 12b is resting.

Figure 3:
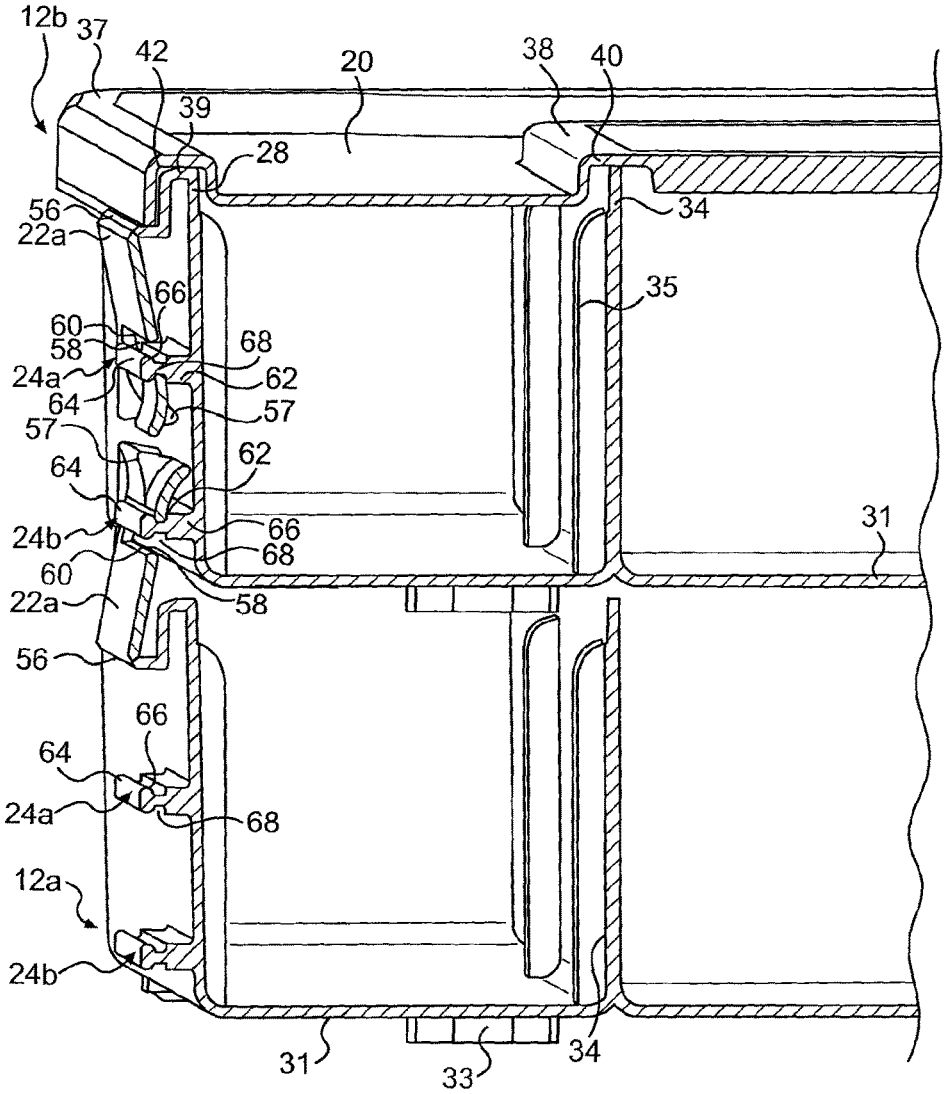
FIG. 3 is a cross-sectional view of the container storage assembly in accordance with the embodiment of FIG. 1.

As shown in FIG. 1, periphery ridges 37 may be provided on the periphery of the cover 20. The periphery ridges 37 may be constructed and arranged to abut against the top portions 39 of the back wall 26, the left wall 28, the front wall 30, and the right wall 32 (see FIG. 3). As shown in FIG. 3, the top portion 39 of the left wall 28 may be constructed and arranged to fold outwardly to form a U-shape. As such, the inner portion 42 of the periphery ridges 38 may abut against at least a portion of the U-shaped top portion 39. The top portions 39 of the back wall 26, the front wall 30, and the right wall 32 may be constructed and arranged in a similar manner as the top portion 39 of the left wall 28. The top portions 39 may optionally have other constructions and arrangements.

In the embodiment shown in FIG. 1, the top surface of the cover 20 also includes center ridges 38. The inner portion 40 of the center ridges 38 may be constructed and arranged to abut against the dividers 34 when the cover is in the closed position, as shown in FIG. 3. As such, the cover 20 of the first container 12a may be reinforced by the ridges 37 and 38 and their abutment with the top portions 39 of the back wall 26, the left wall 28, the front wall 30, and the right wall 32 and the dividers 34, respectively, when the second container 12b is stacked on top of the first container 12a. Alternatively, in one embodiment, the inner portion 40 of the ridges 38 are constructed and arranged to be positioned at a minimal distance above the dividers 34 when the cover 20 is initially in the closed position, but may abut against the dividers 34 when heavy objects are placed on top of the cover 20 to cause the cover 20 to depress downward. The center ridges 38 may optionally have different locations or arrangements.

Figure 8:
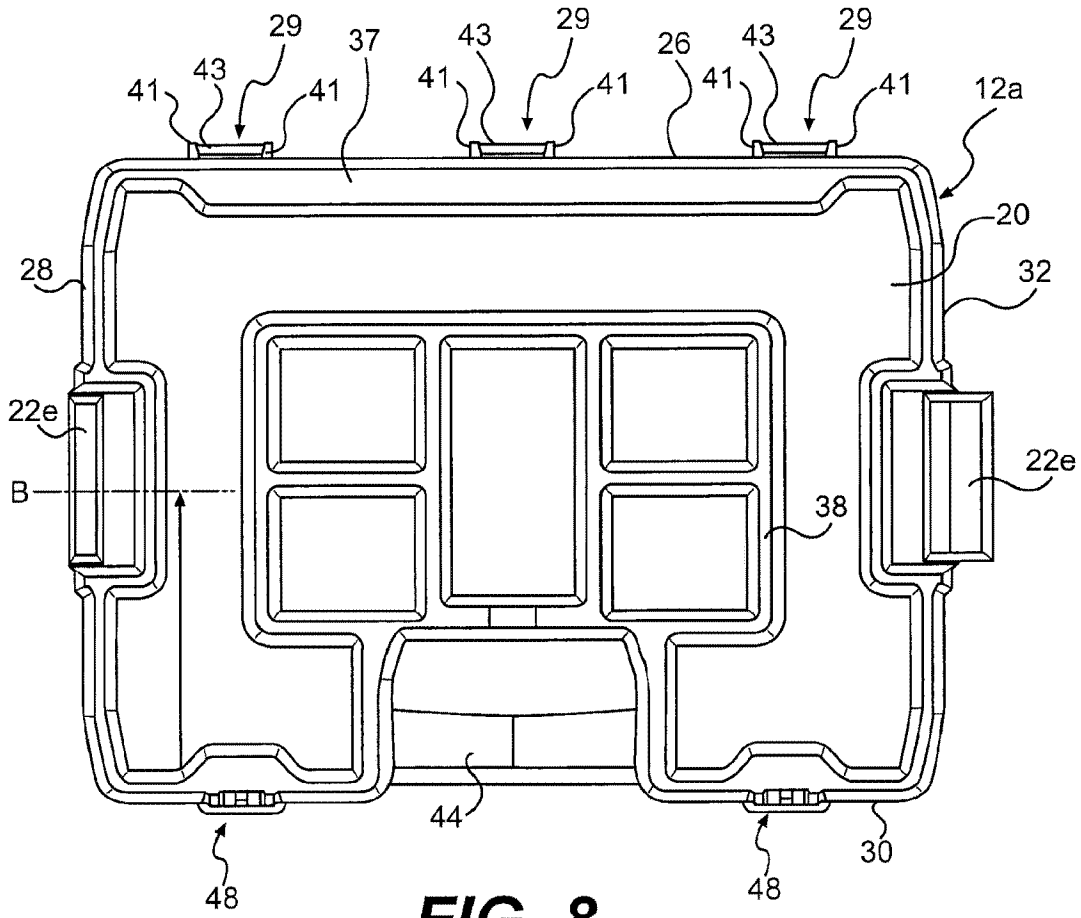
FIG. 8 is a top view of the container storage assembly in accordance with the embodiment of FIG. 7.

In one embodiment, each of the containers 12a and 12b of the container storage system 10 includes a cover 20 when the containers 12a and 12b are connected. The cover 20 of any of the containers 12a and 12b may optionally be removed such that both, one, or none of the containers 12a and 12b have covers 20 when the containers 12a and 12b are connected. The cover 20 may be pivotally connected to the container portion 14 using hinges, pins, screws, fastenings, bolts, or any other connecting mechanism as would be appreciated by one skilled in the art. In one embodiment wherein hinges 29 are used to pivotally connect the cover 20 to the container portion 14, the hinges 29 are constructed and arranged to extend from the rear wall 26 of the container portion 14 (see FIG. 8). The hinges 29 may also be constructed and arranged to be detachable so that the cover 20 can be detached and removed from the container portion 14. For example, in FIG. 8, each hinge 29 includes side portions 41 that are pivotally engaged with a middle portion 43. The side portions 41 of the hinges 29 may be connected to the container portion 14 and the middle portion 43 of the hinges 29 may be connected to the cover 20. As such, the middle portion 43 of the hinges 29 may be disconnected from the side portions 41 of the hinges 29 so that the cover 20 can be detached and removed from the container portion 14. Any conventional types of hinges may optionally be used. The cover 20 may also be a slide-on cover which is slid on to container portion 14 or a snap-on cover that is snapped on to the container portion 14. It is contemplated that the methods of mounting the lid 14 on to the container portion 14 may vary and the number of covers 20 may vary. For example, there may be two covers 20 pivotally connected to the container portion 14 wherein each cover 20 may be opened or closed independently of the other. The cover 20 may be made of plastic, metal, wood, other materials, or a combination thereof. It is contemplated that all or any of the parts of the container 10 may be made from a molded plastic material.

In the embodiment shown in FIG. 1, each of the containers 12a and 12b includes a handle 44 constructed and arranged to enable a user to lift the container 12a or 12b. A depression 46 may be formed between the front wall 30 and the handle 44 to allow better access to the handle 44. In one embodiment, the handle 44 may be made of a flexible material, such as, for example, elastomer, rubber or plastic. The handle 44 may be a curved arc, such as shown in FIG. 1, or may have other shapes (see FIG. 5). In another embodiment, the handle 44 may be a rigid and fixed handle. In some embodiments, the handle 44 may be pivotally connected to the containers 12a and 12b via hinges, pins, screws, fastenings, bolts, or any other connecting mechanism as would be appreciated by one skilled in the art.

Figure 5:
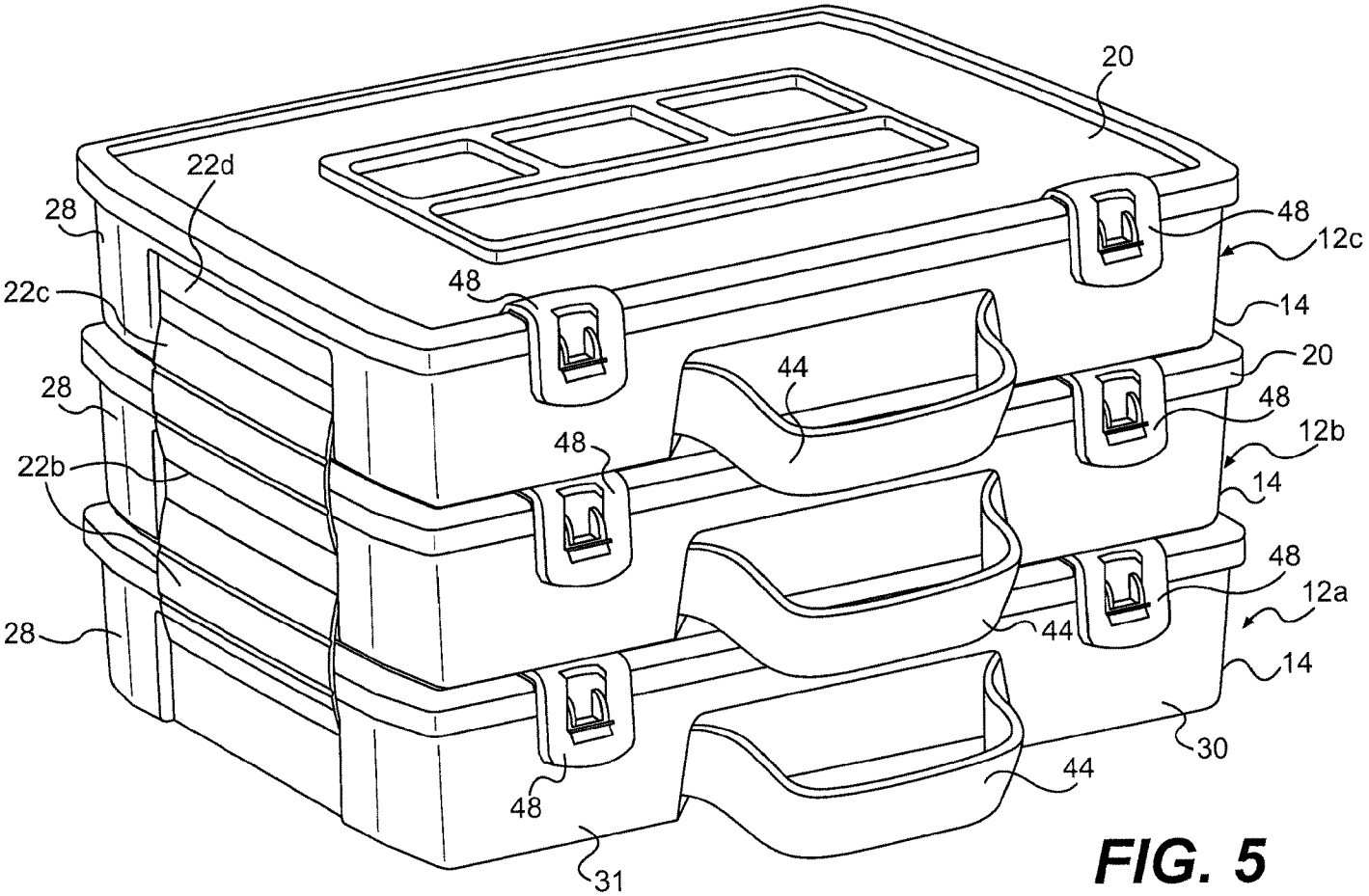
FIG. 5 is a perspective front view of the container storage assembly in accordance with another embodiment of the present invention.

Each of the containers 12a and 12b may include a cover latch or latch mechanism 48 constructed and arranged to latch the cover 18 to the container portion 14. In the embodiment shown in FIG. 1, the container 12b includes a pair of snap-on cover latches 48. Although FIG. 1 shows only container 12a as having cover latches 48, it is contemplated that all of the containers 12a, 12b, 12c may have cover latches 48 when they are connected to each other, as shown in FIG. 5. The cover latch 48 may be integrally formed with the cover 20 (e.g., as a living hinge) or may be a separate piece connected to the cover 20. The cover latch 48 may be constructed and arranged to extend downwardly and generally perpendicular to the plane of the cover 20. In another embodiment, the cover latch 48 is pivotally connected to the container portion, and can secure the cover 20 by engaging a latch receiving portion on the cover. An opening 52 may be formed in the cover latch 48 and may be constructed and arranged to engage with a latch engaging element 54, which takes the form of a protrusion in FIG. 1, on the container portion 14, so as to latch the cover 20 to the container portion 14. To latch the cover 20 to the container portion 14, the user may simply push down the cover 20 towards the container portion 14 so that the protrusion 54 slides against the surface of the cover latch 48 until the protrusion 54 snaps into the opening 52. To unlatch the cover 20, the user may simply pull the cover latch 48 in a direction away from the protrusion 54 so that the protrusion is no longer engaged with the opening 52. The user may then lift the cover 20 to the open position. It is contemplated that the location of the protrusion 54 and the opening 52 may be switched so that the protrusion 54 is located on the cover 20 and the opening 52, which may also take the form of a depression, is located on the container portion 14. It is also contemplated that the configuration and number of cover latches 48 may vary in other embodiments. For example, the cover latch 48 may be one or more pivotable latches, buckles, or other latching mechanism. In another embodiment, the latch 48 is linearly slidable rather than pivotable.

In the embodiment shown in FIG. 1, each of the containers include the upper retaining member or upper latch receiving portion 24a and the lower retaining member or lower latch receiving portion 24b. Each of the containers 12a and 12b also includes the pivotal latch member 22a that may be pivoted between the first position, where the latch member 22a engages the upper retaining member 24a to inhibit pivotal movement of the latch member 22a away from the first position, and the second position, where the latch member 22a of one of the containers 12a and 12b engages with the lower retaining member 24b of another one of the containers 12a and 12b to connect the containers 12a and 12b. The latch member 22a may be in the first position when the latch member 22a is not being used to connect the containers 12a and 12b. The latch member 22a may be in the second position when the latch member 22a is being used to connect the containers 12a and 12b. As shown in FIG. 1, the latch member 22a may be pivotably connected to the container portion 14 of each container 12a and 12b via a living hinge 56. It is contemplated that the latch member 22a may be connected to other parts of the container 12a or 12b, such as the cover 20. It is also contemplated that the latch member 22a may be pivotably connected to the cover 20 or container portion 14 via hinges, pins, screws, fastenings, bolts, or any other connecting mechanism. In the embodiment shown in FIG. 1, the retaining members 24a and 24b and the latch member 22a are connected to the left wall 28 and the right wall 32 of the container portion 14. However, the retaining members 24a and 24b and the latch member 22a may be positioned at other locations, such as, for example, the back wall 26 and the front wall 30. It is contemplated that there may be retaining members 24a and 24b and latch members 22a on all or any combination of the back wall 26, left wall 28, front wall 30, and right wall 32.

Figure 2:
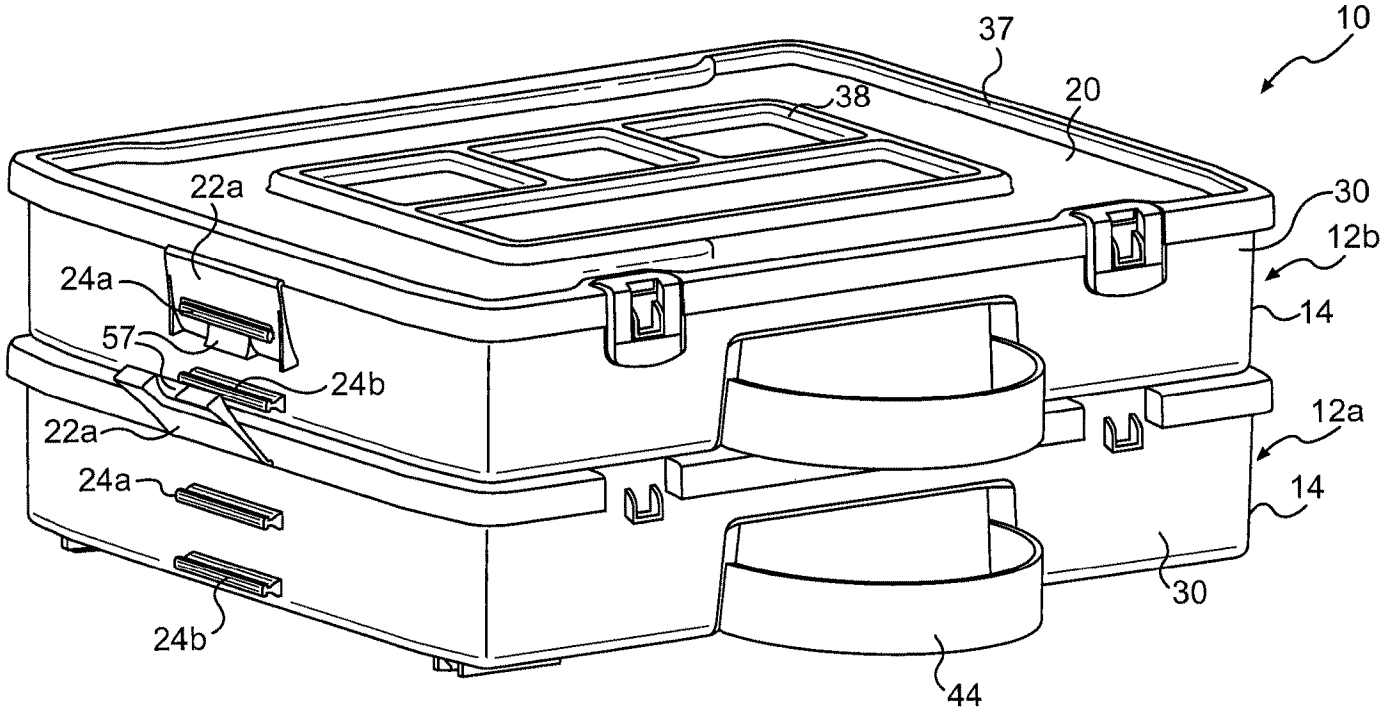
FIG. 2 is a perspective front view of a container storage assembly in accordance with the embodiment shown in FIG. 1.

To disconnect the containers 12a and 12b, the latch member 22a of container 12a is disengaged from the retaining member 24b of container 12b and is pivoted in a counterclockwise direction (as shown in FIG. 2). The latch member 22a of container 12a may then be engaged with the retaining member 24a of the container 12a. A tab 57 may be constructed and arranged to extend from the latch member 22a to facilitate the pushing of the latch member 22a to engage the latch member 22a with the retaining members 24a and 24b and the pulling of the latch member 22a to disengage the latch member 22a from the retaining members 24a and 24b.

In the embodiment shown in FIG. 3, the latch member 22a includes an engaging element 58, which takes the form of a recess, that is constructed and arranged to engage with the retaining members 24a and 24b. An upper periphery portion 60 defines the top of the recess 58 in the latch member 22a. A lower periphery portion 62 defines the bottom of the recess 58 in the latch member 22a. The lower periphery portion 62 may be constructed and arranged to engage with either an upper groove 66 or a lower groove 68 of the retaining members 24a and 24b.

As shown in FIG. 3, the retaining member 24a, 24b includes a lip 64, the upper groove 66, and the lower groove 68. The engaging member 22a may be constructed and arranged such that when the engaging member 22a is engaged with the upper retaining member 24a, the lower periphery portion 62 of the engaging member 22a is retained in the lower groove 68 of the retaining member 24a. Alternatively, when the engaging member 22a of one of the containers 12a or 12b is engaged with the lower retaining member 24b of another one of the containers 12a or 12b to connect the containers 12a and 12b, the lower periphery portion 62 may be retained in the upper groove 66 of the retaining member 24b.

As shown in FIG. 3, the latch member 22a of container 12b is in the first position, wherein the latch member 22a of container 12b is engaged with the upper retaining member 24a of container 12b. The lower periphery portion 62 of latch member 22a of container 12b is disposed in the lower groove 68 of the retaining member 24a of container 12b. In FIG. 3, the latch member 22a of container 12a is in the second position, wherein the latch member 22a is engaged with the lower retaining member 24b of container 12b. The lower periphery portion 62 of latch member 22a of container 12a is disposed in the upper groove 62 of the lower retaining member 24b of container 12b.

To engage the latch member 22a of container 12b with the upper retaining member 24a of container 12b, the user may simply pivot the latch member 22a downwards in a counterclockwise direction towards the retaining member 24a. The lower periphery portion 62 that defines the recess 58 of latch member 22a is constructed and arranged to slide against a lower surface of the lip 64 until the lower periphery portion 62 snaps into the lower groove 68, thus engaging the latch member 22a with the retaining member 24a. To disengage the latch member 22a from the retaining member 24a, the user may simply pull the latch member 22a pivotally upwards in the clockwise direction via the tab 57. As such, the lower periphery portion 62 is removed from the groove 68 and is slid along the lower surface of the lip 64 until the latch member 22a is completely disengaged from the retaining member 24a.

To engage the latch member 22a of container 12a with the lower retaining member 24b of container 12b so that container 12a is connected to container 12b, the user may simply pivot the latch member 22a upwards in a clockwise direction towards the retaining member 24b. As the latch member 22a is pushed against the retaining member 24b, the lower periphery portion 62 of the recess 58 slides against an upper surface of the lip 64 until the lower periphery portion 62 snaps into the upper groove 66, thus engaging the latch member 22a with the retaining member 24b. To disengage the latch member 22a from the retaining member 24b, the user may simply pull the latch member 22a pivotally downwards in the counterclockwise direction via the tab 57. As such, the lower periphery portion 62 is removed from the upper groove 66 and is slid along the upper surface of the lip 64 until the latch member 22a is completely disengaged from the retaining member 24b. It is contemplated that in some embodiments, the latch member is moveable relative to the container portion 14 via other means. For example, the latch member 22a may be constructed and arranged to be slideable between the first and second positions.

In the embodiment shown in FIG. 5, containers 12a, 12b, and 12c are connected via latch members 22b, 22c, and 22d. Latch members 22b, 22c, and 22d are constructed and arranged in the same manner, but are labeled with "b", "c", and "d" to better differentiate among them in the description below. Each container 12a, 12b, and 12c includes the cover 20 and container portion 14. The covers 20 may optionally be removed so that none, one, or two of the containers have covers 20 when the containers 12a, 12b, and 12c are connected. The containers 12a, 12b, and 12c may be similarly constructed and arranged as containers 12a and 12b shown in FIG. 1.

Figure 6:
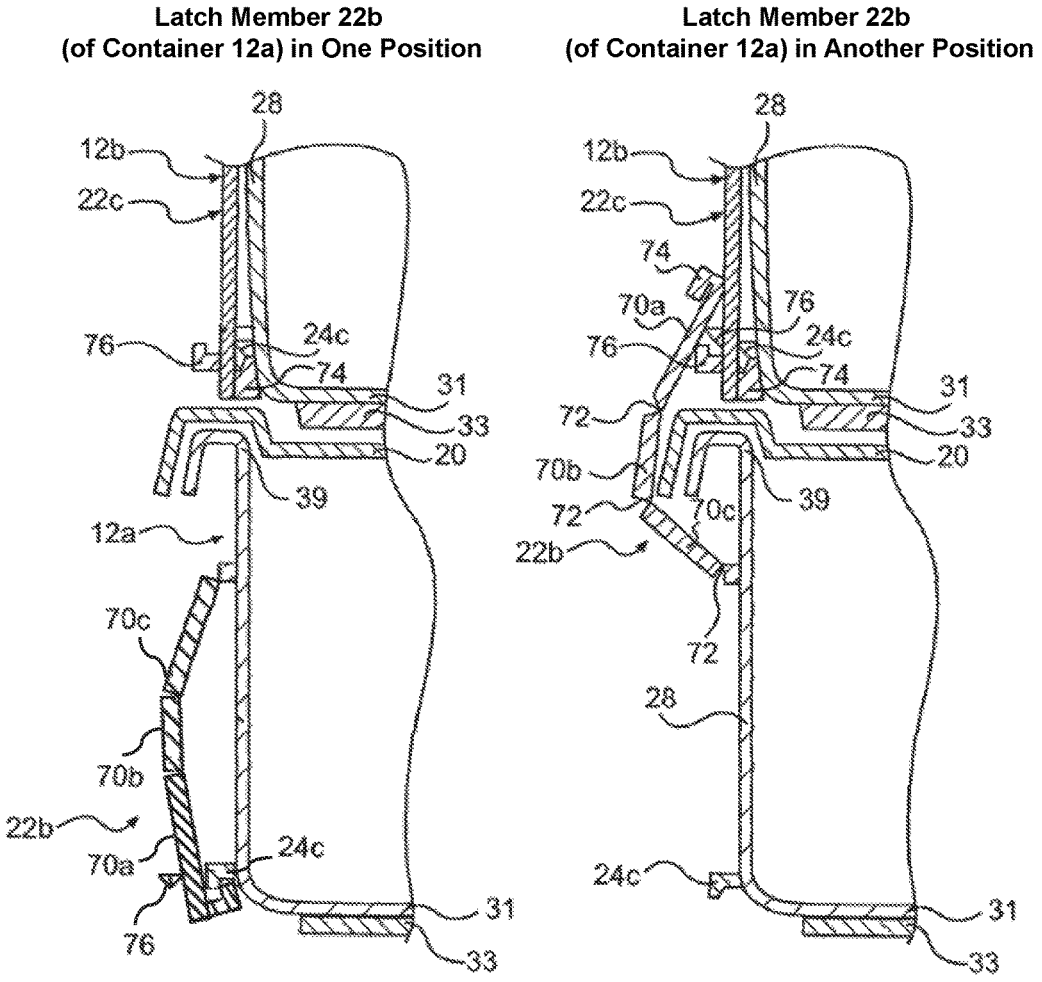
FIG. 6 is a cross-sectional view of the container storage assembly in accordance with the embodiment of FIG. 5.

In the embodiment shown in FIG. 6, the latch member 22b, which is pivotally attached to container 12a, is used to connect container 12a to container 12b. Although FIG. 6 only shows the connection between containers 12a and 12b, the description below may also be generally applicable to the connection between containers 12b and 12c. When the container 12b is connected to container 12a, the feet 33 of container 12b may be disposed against the cover 20 of container 12a. In some embodiments, the bottom surface 31 of container 12b may be disposed against the cover 20 of container 12a when container 12b is connected to container 12a. In embodiments where the cover 20 of container 12a is removed, at least a portion of the bottom wall 31, the back wall 26, the left wall 28, the front wall 30, and the right wall 32 of container 12b may be disposed on the top portions 39 of the back wall 26, the left wall 28, the front wall 30, and the right wall 32 of container 12a.

As shown in FIG. 6, the latch member 22b includes a plurality of segments 70a, 70b, and 70c connected via living hinges 72. The segments 70a, 70b, and 70c may optionally be connected using hinges, pins, screws, fastenings, bolts, or any other connecting mechanism. It is contemplated that the number of segments may vary.

In this embodiment, the latch member 22b or 22c may be pivoted between the first position, where the latch member 22b or 22c engages a retaining member or latch receiving portion 24c to inhibit pivotal movement of the latch member 22b or 22c away from the first position, and the second position, where the latch member 22b or 22c of one of the containers 12a and 12b engages with a portion of the latch member 22b or 22c of another one of the containers 12a and 12b to connect the containers 12a and 12b. Because the latch member 22b or 22c may be pivoted to the first position when the latch member 22b or 22c is not being used to connect one of the containers 12a or 12b to another one of the containers 12a or 12b, this results in being able to prevent the latch member 22b or 22c from hindering use of the containers 12a and 12b or from getting lost. Another result is the prevention of the latch member 22b or 22c from accidentally being removed or dislocated from the containers 12a and 12b when the latch member 22b or 22c is not being used to connect the containers 12a and 12b.

As shown in FIG. 6, each of the containers 12a and 12b may include the retaining member 24c, which takes the form of a downwardly facing hook in this embodiment, that is constructed and arranged to engage with the latch member 22b or 22c. The latch member 22b or 22c may include an engaging member 74, which takes the form of an upwardly facing right hook in this embodiment when the latch member 22b or 22c is in the first position, and an engaging member 76, which takes the form of a upwardly facing left hook in this embodiment when the latch member 22b or 22c is in the first position. The engaging member 74 of the latch member 22b or 22c may be constructed and arranged to engage with the retaining member 24c when the latch member 22b or 22c is in the first position. The engaging member 74 of the latch member 22b of container 12a may also be constructed and arranged to engage with the retaining member 24c of container 12b when the latch member 22b is in the second position.

In the embodiment shown in FIG. 5, the retaining members 24c and the latch members 22b, 22c, and 22d are located on the left wall 28 and the right wall 32 of the container portion 14. However, the retaining members 24c and the latch members 22b, 22c, or 22d may be positioned at other locations, such as, for example, the back wall 26 and the front wall 30. It is contemplated that there may be retaining members 24c and latch members 22b, 22c, or 22d on all or any combination of the back wall 26, left wall 28, front wall 30, and right wall 32.

Referring back to FIG. 6, the latch member 22c of container 12b is in the first position such that the upwardly facing right hook 74 of the latch member 22c is engaged with the retaining member 24c of container 12b. The engaging member 76 of the latch member 22c is facing upwards and is constructed and arranged to engage with the engaging member 76 of the latch member 22b. As shown in FIG. 6, when the latch member 22b is in the second position, the engaging member 76 of the latch member 22b is facing downwards and is engaged with the upwardly facing engaging member 76 of the latch member 22c. In the second position, the engaging member 74 of the latch member 22b is facing away from the container 12b when it is not being used to engage with any portions of containers 12a and 12b.

When the latch member 22b or 22c of a first of the containers 12a and 12b is not being used to connect another one of the containers 12a and 12b above the first container 12a or 12b, the user may simply pull the latch member 22b or 22c of the first container 12a or 12b downwards so that the engaging member 74 is engaged with the retaining member 24c of the first container 12a or 12b. In the embodiment shown in FIG. 6, the latch member 22c is in the first position such that the engaging member 74 of the latch member 22c is engaged with the retaining member 24c. In this embodiment, to connect containers 12a and 12b, the user may simply pivot the latch member 22b upwardly in the clockwise direction and then engage or hook engaging member 76 of the latch member 22b to engaging member 76 of the latch member 22c. The engaging member 74 of the latch member 22b may be constructed and arranged to facilitate the lifting of the latch member 22b to the second position. To disengage the engaging member 76 of the latch member 22b from the engaging member 76 of the latch member 22c, the user may simply pull the latch member 22b in an upwards direction until the engaging member 76 of the latch member 22b is removed from the engaging member 76 of the latch member 22c. The user may then pivot the latch member 22b downwards in a clockwise direction to move the latch member 22b to the first position.

In the embodiment of FIG. 6, if the latch member 22c is being used to latch container 12c to the top of container 12b, the latch member 22b may be engaged with the retaining member 24c of the container 12b to connect the containers 12a and 12b together. To accomplish this, the user may further rotate latch member 22b in the clockwise direction to engage engaging member 74 of the latch member 22b with the retaining member 24c of the container 12b. For example, to engage engaging member 74 of the latch member 22b with the retaining member 24c of container 12b, the user may position the engaging member 74 to face upwardly so as to hook into and engage with the downwardly facing retaining member 24c of container 12b. To disengage the engaging member 74 of the latch member 22b from the retaining member 24c of container 12b, the user may simply push the engaging member 74 in a downwards direction until the engaging member 74 is unhooked from the retaining member 24c. The user may then pivot the latch member 22b downwards in a counterclockwise direction to move the latch member 22b towards the first position.

Container 12b may be connected to container 12c using latch members 22c and 22d in a similar manner as described previously with respect to the latch members 22b and 22c of containers 12a and 12b, respectively. It is contemplated that additional containers may be connected to the containers 12a, 12b, and 12c in a similar manner.

Figure 7:
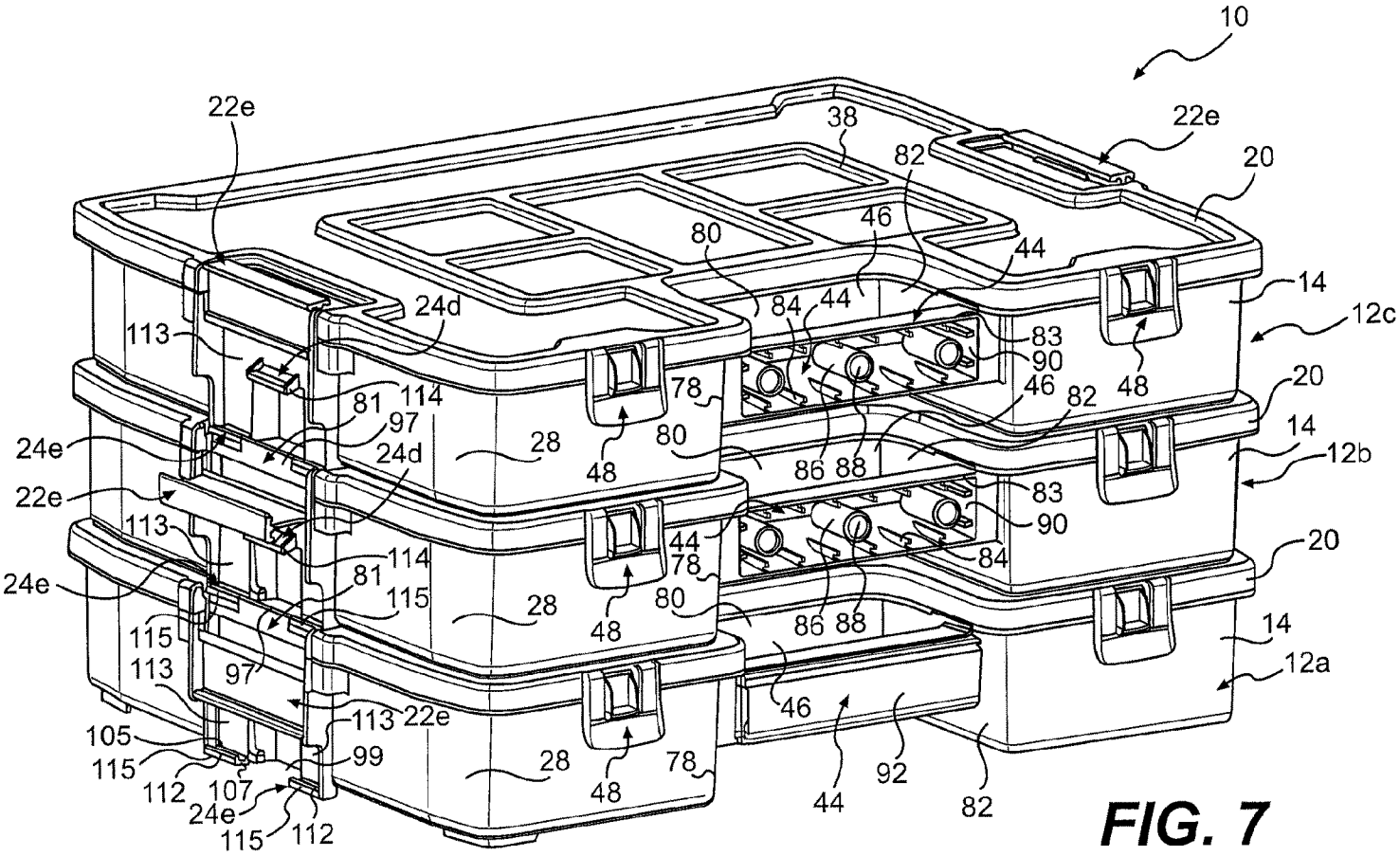
FIG. 7 is a perspective front view of the container storage assembly in accordance with another embodiment of the present invention.

As shown in FIG. 7, in another embodiment, the container system 10 has a plurality of containers 12a, 12b, and 12c that are constructed and arranged to be connected together. Each of the containers 12a, 12b, and 12c includes the latch member 22e that when in the latched position (or the second position), is positioned to a) secure the cover in the closed position and b) connect one of the containers 12a, 12b, and 12c to another one of the containers 12a, 12b, or 12c. Specifically, in the embodiment shown in FIG. 7, the pivotal latch member 22e can be pivoted between the first position (or unlatched position), where the latch member 22e engages the upper retaining member or upper latch receiving portion 24d to inhibit pivotal movement of the latch member 22e, and the second position, where the latch member 22e engages with a) an engaging member 81 (see FIG. 9) of its associated cover 20 to latch the cover 20 thereon and/or b) a lower retaining member or latch receiving portion 24e of another one of the containers 12a, 12b, or 12c to connect the containers 12a, 12b, 12c. In other embodiments, no retaining member is provided to engage with the latch member 22e when the latch member 22e is in the unlatched position. Many of the components of the embodiment shown in FIG. 7 are similar to the components of the embodiment shown in FIG. 1, and thus will be labeled in a similar manner. In the embodiment shown in FIG. 7, each container 12a, 12b, and 12c includes the cover 20 and container portion 14. The covers 20 may optionally be removed so that none, one, or two of the containers have covers 20 when the containers 12a, 12b, and 12c are connected. The containers 12a, 12b, and 12c may be similarly constructed and arranged as containers 12a and 12b shown in FIG. 1.

In the embodiment shown in FIG. 7, a depression 46 is formed in the front of the container portion 14. In this embodiment, a left portion 78, a back portion 80, and a right portion 82 define the U-shaped depression 46. The depression 46 may take any other shapes or forms, and may be constructed and arranged to receive the handle 44. In this embodiment, the handle 44 extends between the left portion 78 and the right portion 82. The handle 44 may be hollow and may include ribs 84 deployed along the interior surface thereof. The ribs 84 may provide reinforcement for the handle 44 when the handle 44 is grasped by the user. In this embodiment, the handle 44 includes a back portion 83 having projections 86 with recesses 88 provided therein. The projections 86 may be constructed and arranged to extend generally perpendicularly relative to the back portion 83 in an interior space 90 of the back portion 83. The recesses 88 of the projections 86 may be constructed and arranged to receive projections (not shown) located on a front plate 92. Accordingly, the back portion 83 and the front plate 92 may be connected so as to form the handle 44. The handle 44 may optionally be made of plastic, metal, wood, rubber, other materials known in the art, or any combination thereof. Rubber, foam, or other anti-slip materials may be provided on the surface thereof so as to facilitate the grasping of the handle 44. In one embodiment, the back portion 83 of the handle 44 may be made from a plastic material and the front portion 92 of the handle 44 may be made from a rubber material.

Figure 9:
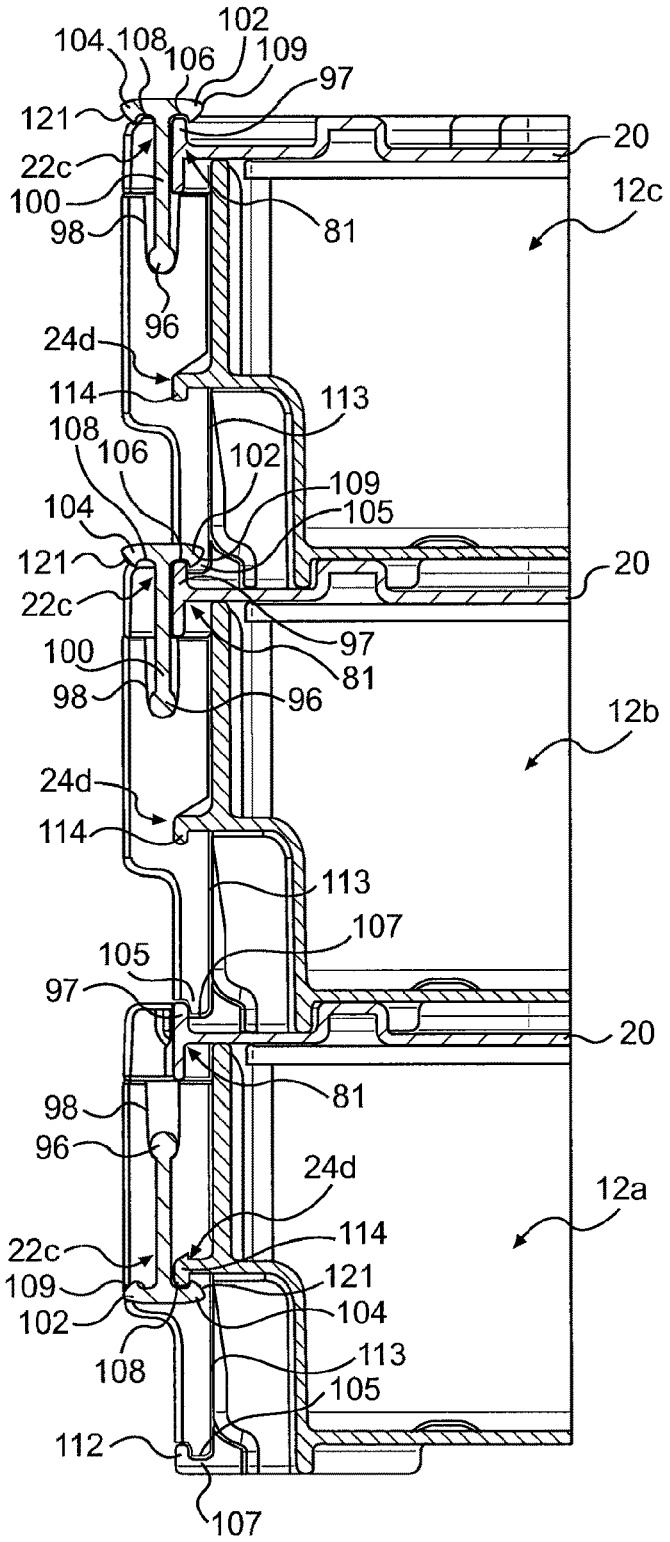
FIG. 9 is a cross-sectional view of the container storage assembly in accordance with the embodiment of FIG. 7.

As shown in FIG. 9, the pivotal latch member 22e may be pivotally connected to the container portion 14 of each container 12a, 12b, and 12c. Specifically, in one embodiment, the latch member 22e has a curved cylindrical end 96 that is received in a groove 98 with a curved surface so that the cylindrical end 96 may pivot within the groove 98. It is contemplated that the latch member 22e may also be connected to the container portion 14 using pins, hinges, or other connecting mechanisms that enable pivotal movement. In one optional embodiment, the latch member 22e may optionally be removable from the container portion 14.

In the embodiment shown in FIG. 9, the latch member 22e of container 12c is in the second position (or latched position), where the latch member 22e is engaged with the engaging member 81 of its associated cover 20 to latch the cover 20 to the container portion 14. The latch member 22e of container 12b is also in the second position, where the latch member 22e is engaged with the engaging member 81 of the cover 20 to latch the cover 20 to the container portion 14 and with the lower retaining member 24e of the container 12c to latch the containers 12b and 12c together. In contrast, the latch member 22e of container 12a is in the first position (or unlatched position), where the latch member 22e is engaged with the upper retaining member 24d so as to inhibit pivotal movement of the latch member 22e away from the first position.

In the embodiment shown in FIG. 9, each latch member 22e has a generally T-shaped cross-section (as shown), with an elongated body 100 and two fingers 102, 104 extending in opposite directions from one end of the body 100. A groove 106 may be formed at an area between the finger 102 and the body 100 and may be constructed and arranged to receive the lower retaining member 24e and/or the engaging member 81 of the cover 20 when the latch member 22e is in the second position. Similarly, a groove 108 may be formed at an area between the finger 104 and the body 100 and may be constructed and arranged to receive the upper retaining member 24d when the latch member 22e is in the first position. It is contemplated that the user may pull or push on the fingers 102, 104 of the latch member 22e to pivot the latch members 22e between the first and second positions.

In one embodiment, each lower retaining member or lower latch receiving portion 24e takes the form of two portions 115 with an opening 99 provided between the two portions 115, as shown in FIG. 7. The two portions 115 that form the lower retaining member 24e are identical and thus the descriptions below with regard to the lower retaining member 24e will be considered to apply to both portions. In the embodiment shown in FIG. 7, an outer wall 113, to which the upper retaining member 24d is attached, extends parallel with respect to the left wall 28. In some embodiments, the outer wall 113 may form a part of the side wall 28.

The lower retaining member 24e and the engaging member 81 of the cover 20 are constructed and arranged such that when one of the containers 12a, 12b, or 12c is stacked on top of another one of the containers 12a, 12b, or 12c, the engaging member 81 of the cover 20 is positioned between the two portions 115 of the lower retaining member 24e of the upper container 12a, 12b, or 12c (within the opening 99). For example, as shown in FIG. 7, the engaging member 81 of the cover 20 of container 12a is positioned between the two portions 115 of the lower retaining member 24e of container 12b. In the embodiment shown in FIG. 7, the engaging member 81 of the cover 20 takes the form of an elongated lip 97. As such, this enables the latch member 22e of the lower container 12a, 12b, or 12c to engage with both a) the engaging member 81 of its associated cover 20 and b) the lower retaining member 24e of the upper container 12a, 12b, or 12c, which will be described in more detail later.

In one embodiment, the engaging member 81 of the cover 20 includes the lip 97 that is constructed and arranged to engage with the groove 106 of the latch member 22e when the latch member 22e is in the second position. In the embodiment shown in FIG. 9 (see container 12a), the lower retaining member 24e includes a lip 112 that is constructed and arranged to engage with the groove 106 of the latch member 22e when the latch member 22e is in the second position. Similarly, the upper retaining member 24d includes a lip 114 that is constructed and arranged to engage with the groove 108 of the latch member 22e when the latch member 22e is in the first position. As shown in FIG. 7, the lip 114 of each container 12a, 12b, 12c extends in a downward direction parallel to the side wall 28 of each container 12a, 12b, 12c.

As shown in FIGS. 7 and 9 and which can be seen with regard to container 12a, the lower retaining member 24e includes a connecting portion 107 that connects the outer wall 113 with the lip 112. The outer wall 113, connecting portion 107, and the lip 112 define a recess 105 that is constructed and arranged to receive a portion of the finger 102 when the latch member 22e is in the second position. As shown in FIG. 9, the lip 112 of the lower retaining member 24e of containers 12a, 12b, 12c extends upwardly in a direction perpendicular to the connecting portion 107.

As mentioned above, the engaging member 81 of the cover 20 includes the elongated lip 97. As shown in FIG. 7 and which can be seen with regard to containers 12a and 12b, when the cover 20 of container 12a is positioned on top thereof, the lip 97 of the cover 20 is aligned with the lip 112 of the lower latch member 24e of container 12b. This enables the latch member 22e of container 12a to latch the 1) cover 20 of container 12a thereto and b) connect container 12a with container 12b. Containers 12b and 12c may also have such configurations so that they may be connected in a similar manner.

To engage the latch member 22e of container 12a, 12b, or 12c with the upper retaining member 24d located thereon, the user may simply pivot the latch member 22e downwards in a counterclockwise direction (as seen in FIG. 9) towards the retaining member 24d. In the embodiment shown in FIG. 9 and which will be described with regard to container 12a, the finger 104 of the latch member 22e of container 12a may be pushed against the lip 114. Specifically, a front surface 121 of the finger 104 may be pushed against an outer surface of the lip 114 until the resiliency of the lip 114 and the finger 104 enables the lip 114 to snap into the groove 108 and thus be retained by the groove 108. As such, the latch member 22e is inhibited from movement away from this first position.

To disengage the latch member 22e from the upper retaining member 24d, the user may simply pull the latch member 22e pivotally upwards in the clockwise direction (as viewed in FIG. 9) via the finger 102 of the latch member 22e. The resiliency of the lip 114 and the finger 104 enables the lip 114 of the upper retaining member 24d to snap out of the groove 108 of the latch member 22e. As such, the upper retaining member 24d is no longer engaged with the latch member 22e. All of the containers 12a, 12b, 12c may optionally have such configurations.

To engage the latch member 22e of container 12b with the lower retaining member 24e of container 12c, as shown in the embodiment of FIG. 7, the user may simply pivot the latch member 22e upwards in a clockwise direction (as viewed in FIG. 9) towards the retaining member 24e. In the embodiment shown in FIG. 9 and which will be described with regard to containers 12b and 12c, the finger 102 of the latch member 22e of container 12b may be pushed against the lip 112 of the lower retaining member 24e of container 12c. In this Figure, the lip 112 is obstructed from view by lip 97. However, lip 112 of containers 12b and 12c have the same construction and arrangement as lip 112 of container 12a. Specifically, a front surface 109 of the finger 102 may be pushed against an outer surface of the lip 112 until the resiliency of the lip 112 and the finger 102 enables the lip 112 to snap into the groove 106 and thus be retained by the groove 106. In this position, as can be seen with respect to containers 12b and 12c, a portion of the finger 102 of the latch member 22e of container 12b is received within the recess 105 of the container 12c. As such, the latch member 22e is inhibited from movement away from this second position. Any one of the containers 12a, 12b, and 12c may be connected to another one of the containers 12a, 12b, or 12c in a similar manner. In particular, the container 12c may be connected to container 12b in a similar manner as described above.

To disengage the latch member 22e from the lower retaining member 24e, the user may simply pull the latch member 22e pivotally downwards in the counterclockwise direction via the finger 104 of the latch member 22e. Accordingly, the lip 112 of the lower retaining member 24e is removed from the groove 106. As such, the finger 102 is removed from the recess 105 of the lower retaining member 24e, and the lower retaining member 24e is no longer engaged with the latch member 22e.

The latch member 22e may also engage with the engaging member 81 of the cover 20 in a similar manner as the aforementioned description. Specifically, to engage the latch member 22e of container 12b with the lip 97 of the engaging member 81 of its associated cover 20, the user may simply pivot the latch member 22e upwards in a clockwise direction towards the engaging member 81. As such, the finger 102 of the latch member 22e is pushed against the lip 97 of the engaging member 81 until the resiliency of the lip 97 and the latch member 22e enables the lip 97 to snap into the groove 106 of the latch member 22e. The lip 97 is thus retained in the groove 106 and the latch member 22e is engaged with the engaging member 81 of the cover 20. As mentioned above, when the cover 20 is positioned on top of a first container 12a, 12b, or 12c, the engaging member 81 of the cover 20 is positioned between the two portions 115 of the latch member 22e of the second container 12a, 12b, or 12c located above the first container 12a, 12b, or 12c (see, for example, containers 12b and 12c in FIG. 7). Therefore, the latch member 22e of the first container 12a, 12b, or 12c may engage its associated cover 20 as well as another container 12a, 12b, or 12c located above the first container 12a, 12b, or 12c.

To disengage the latch member 22e from the engaging member 81, the user may simply pull the latch member 22e pivotally downwards in the counterclockwise direction via the finger 104 of the latch member 22e. Accordingly, the lip 97 of the engaging member 81 is removed from the groove 106 and the engaging member 81 is no longer engaged with the latch member 22e.

The latch member 22e, the upper retaining member 24d, and the lower retaining member 24e may optionally have other configurations. Just for example, the latch member 22e may have a loop configuration that engages with a hook configuration of the upper retaining member 24d and the lower retaining member 24e. The configuration of the latch member 22 and the retaining members 24e, 24d may optionally be interchanged. In one embodiment, the latch member 22e may include an opening that receives a protrusion of the retaining members 24d, 24e. In one embodiment, the latch member 22e and the retaining members 24d, 24e may be engaged using buckle configurations. In one embodiment, the latch member 22e and the retaining members 24d, 24e may be engaged using snap-fit connections.

Figure 10:
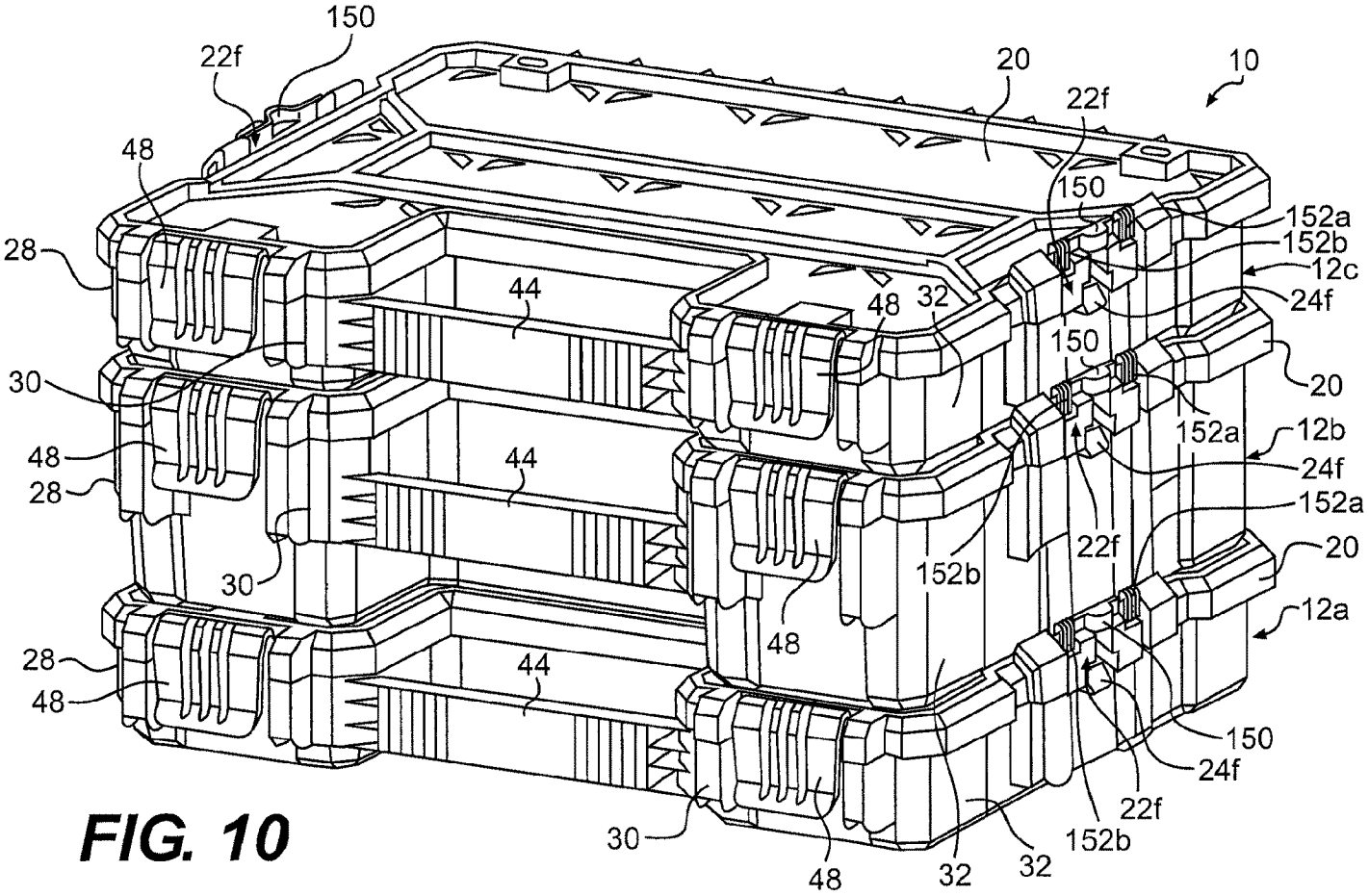
FIG. 10 is a perspective view of the container storage assembly in accordance with another embodiment of the present invention.

As shown in FIG. 10, in another embodiment, the container system 10 has a plurality of containers 12a, 12b, and 12c that are constructed and arranged to be connected or latched together. Many of the components of the embodiment shown in FIG. 10 are similar to the components of the embodiment shown in FIG. 7, and thus will be labeled in a similar manner. Each of the containers 12a, 12b, and 12c includes a latch member 22f that is movable between a first position and a second position. A retaining member or latch receiving portion 24f on the container portion 32 is constructed and arranged to engage with the latch member 22f. In the first position, the latch member 22f engages the retaining member 24f to inhibit movement of the latch member 22f away from the first position. The latch member 22f, when in the second position, is positioned to be able to engage with the container portion 32 of the at least one other container 12a, 12b, 12c, that is above it, to connect the container 12a, 12b, 12c to the above at least one other container 12a, 12b, 12c. The latch member 22f is pivotally movable in a clockwise and counterclockwise manner and can be pivoted upwards to the second position to engage the container portion 32 of the at least one other container 12a, 12b, 12c. The latch member 22f can also be pivoted downwards to the first position to engage the retaining member 24f to inhibit movement of the latch member 22f away from the first position. In one embodiment, the latch member 22f may be pivoted along pivot axis A (see FIG. 12a) between the first and second positions. The latch member 22f may be pivotally connected to the container portion 32 at a pivoting portion 156 of the latch member 22f. In this embodiment, each containers 12a, 12b, 12c includes two latch members 22f and two retaining members 24f associated with the latch members 22f. In embodiments having two (first and second) latch members 22f, the latch members 22f may be provided on the left side 28 and right sides 32, respectively, of the container portions 12a, 12b, 12c. The latch members 22f of each container 12a, 12b, 12c may be constructed and arranged in a similar manner as one another. However, it should be appreciated that the location and number of latch members 22f may vary in other embodiments.

In the embodiment shown in FIG. 10, the handle 44 is located on or near the front side 30 of the container portion 32 between the cover latches 48 (two are shown in this embodiment). Grooves, a layer of elastomeric material, or other materials/structures may be provided on the handle 44 to facilitate grasping thereof. Each cover latches 48 is pivotally connected to the cover 20 and engages a latch engaging element (not shown) on the container portion 32 to lock the cover 20 to the container portion 32. In this embodiment, the cover latches 48 are separate from the latch members 22f. It is contemplated that the location and number of cover latches 48 may vary in other embodiments.

In the illustrated embodiment, each latch members 22f optionally includes an upper portion 150 having an arcuate shape and that is constructed and arranged to facilitate movement of the latch member 22f between the first and second positions. The user may grasp the upper portions 150 when pivoting the latch member 22f between the first and second positions. The upper portion 150 may extend between extending portions 152a, 152b of the latch member 22f. The extending portions 152a, 152b may be provided with grooves or other structures thereon.

Figure 11A:
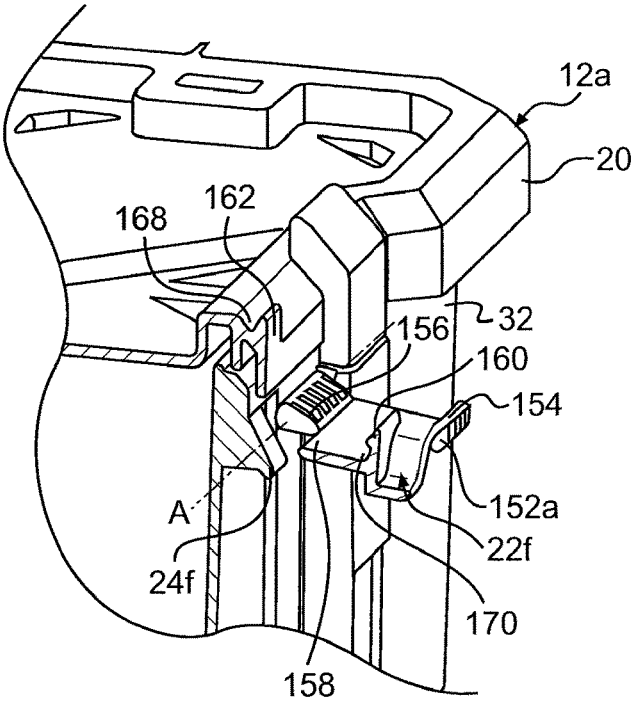
FIGS. 11a-11b are cross-sectional views of a [cover] *latch member* of the container in the [unlatched] *unengaged* and [latched] *engaged* positions, respectively.

FIG. 11a shows a cross sectional view of one half portion of the latch member 22f. The other half portion of the latch member 22f not shown in this Figure may be the mirror image of the portion shown in this Figure to form the whole latch member 22f (see FIG. 10). In this embodiment, the extending portion 152a includes a container engaging portion 154 constructed and arranged to engage with a lower latch receiving portion 24g (see FIG. 12a) of another container 12a, 12b, 12c to connect the containers 12a, 12b, 12c together. The other half portion of the latch member 22f, which includes the extending portion 152b, may be constructed and arranged in a similar manner as the half portion of the latch member 22f shown in FIG. 11a. Thus, there may be a separate container engaging portion 154 on the extending portion 152b that is constructed and arranged to engage with a separate lower latch receiving portion 24g on the other container 12a, 12b, 12c.

In the illustrated embodiment, an optional cover latching portion 160 is provided on the latch member 22f and may be constructed and arranged to engage with a latch engaging portion 162 on the cover 20 to latch or secure the cover 20 in the closed position. The cover latching portion 160 and the container engaging portion 154 may be arranged to be spaced apart on the latch member 22f. For example, as shown in FIG. 11a, the cover latching portion 160 may be positioned closer than the container engaging portion 154 to the pivoting portion 156 of the latch member 22f.

Figure 12A:
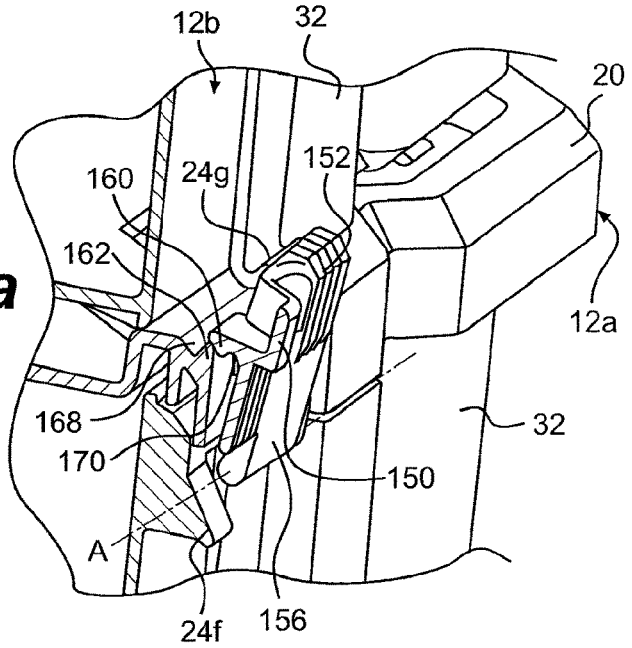
FIGS. 12a-12b are cross-sectional views of the container unlatched from another container and the container latched with another container, respectively.
Figure 12B:
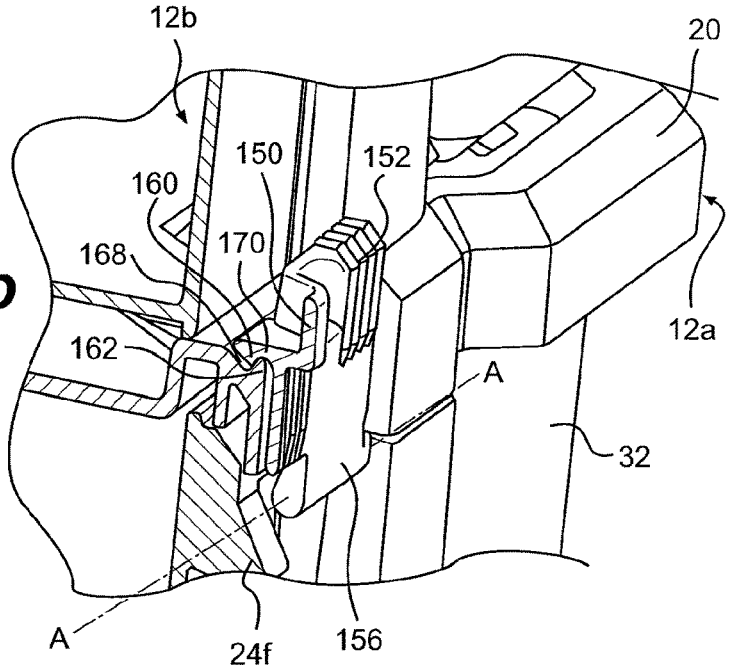

In one embodiment, as shown in FIG. 12b, when the cover latching portion 160 of the latch member 22f is engaged with the latch engaging portion 162 of the cover 20, the cover latching portion 160, which may take the form of a protrusion, is received in a groove 168 of the cover 20 and the latch engaging portion 162, which may take the form of a protrusion, is received in a groove 170 of the latch member 22f. Thus, to lock the cover 20 to the container portion 32 using the latch member 22f, the user may simply pivot the latch member 22f upwards in the counterclockwise direction along the pivot axis A from the position shown in FIG. 11a so that the cover latching portion 160 of the latch member 22f is engaged with the latch engaging portion 162 of the cover 20. It is contemplated that the other half portion of the latch member 22f not shown in FIG. 11a may also have such similar structures but may be arranged in a mirror image manner.

Figure 11B:
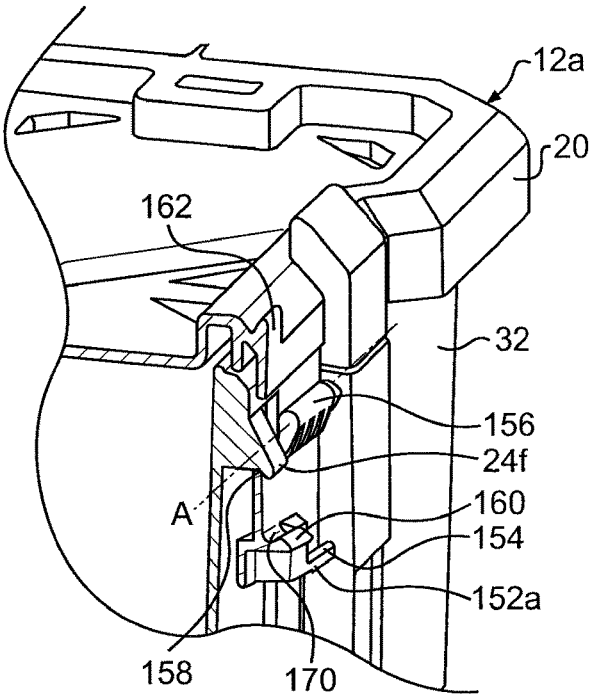

Referring back to FIG. 11a, the latch member 22f may include a retaining portion 158, which takes the form of a ledge in this embodiment, formed on a lower portion of the latch member 22f near the pivoting portion 156. The retaining portion 158 may be constructed and arranged to engage with the retaining member 24f, which takes the form of hook-shaped downward facing structure in this embodiment, when the latch member is in the first position (as shown in FIG. 11b). Thus, to move the latch member 22f to the first position, the user may simply pivot the latch member 22f downwards in the clockwise direction from the position shown in FIG. 11a so that the retaining portion 158 is engaged with the retaining member 24f, as shown in FIG. 11b.

FIG. 12a shows a cross-sectional view of the container 12a unlatched from another container 12b. As shown in the illustrated embodiment, when the container 12b is stacked on the container 12a, the lower latch receiving portion 24g of the container 12b may be positioned at an elevated height relative to the latch engaging portion 162 of the cover 20 of the container 12a. Thus, the cover latching portion 160 and the container engaging portion 154 are positioned on the latch member 22f to accommodate the different vertical positioning of the lower latch receiving portion 24g of the container 12b and the latch engaging portion 162 of the cover 20. Accordingly, when the latch member 22f is pivoted upwards in the counterclockwise direction to the second position along pivot axis A from the position shown in FIG. 11a, the cover latching portion 160 of the latch member 22f may be engaged with the latch engaging portion 162 of the cover 20, and the container engaging portion 154 of the latch member 22f may be engaged with the lower latch receiving portion 24g to 1) latch the cover 20 to the container 12a and to 2) connect the container 12a to the other container 12b, as shown in FIG. 12b. Any combination of at least portions of the latch member 22f, the latch engaging portion 162 of the cover, and the lower latch receiving portion 24g may be made of resilient materials (e.g., plastic) that enable the structures to flex during latching/unlatching. To move the latch member 22f to the first position, the user may simply pivot the latch member 22f downwards in the clockwise position along the pivot axis A to disengage the latch member 22f from the cover 20 and the other container 12b and to engage the latch member 22f with the lower latch receiving portion 24g.

It is contemplated that the other latch members 22f on the containers 12a, 12b, 12c may be constructed and arranged in a similar manner as the latch member 22f described above and may operate in a similar manner. It should be appreciated that although the latch members 22f described above may be pivoted between the first and second positions, it is contemplated that in other embodiments, the latch members 22f may be moved in other ways between the first and second positions. That is, there may be one or any combination of movements such as sliding, pivoting, rotating, or other actions, to move the latch member 22f between the first and second positions.

In some embodiments, the containers 12a, 12b, or 12c have latch members 22a, 22b, 22c, 22d, 22e, or 22f that may be used to lock the cover 20 to the container portion 32 and may also have pivotable cover latches 48 as in the previous embodiments that may be used to lock the cover to the container portion 32.

Although the invention has been described in detail for the purpose of illustration of one or more embodiments, it is to be understood that such detail is solely for that purpose and that the invention is not limited thereto, but, on the contrary, is intended to cover modifications and equivalent arrangements that are within the spirit and scope of the appended claims. In addition, it is to be understood that the present invention contemplates that, to the extent possible, one or more features of any embodiment may be combined with one or more features of any other embodiment.

What is claimed is:

1. A container constructed and arranged to be connected to at least one other container, the container comprising:

a container portion with an opening into an interior space in which articles to be transported can be stored;

a cover for closing the opening;

a latch member movable between a first position and a second position; *and* a retaining member, on the container [portion], *with a downward-projecting lip that is* constructed and arranged to engage with the latch member, wherein [in the first position] the latch member, *when in the first position,* engages the *downward-projecting lip of the* retaining member to inhibit movement of the latch member away from the first position[;] *without latching the cover to the container portion of the container,* wherein the latch member, when in the second position, is positioned to be able to engage with a container portion of *the* at least one other container to connect the container to the at least one other container, wherein the latch member is pivotally movable in a clockwise and counterclockwise manner between the first and second positions, wherein the latch member is pivotable upwards to the second position for engagement with the container portion of the at least one other container, and wherein the latch member is pivotable downwards to the first position for engagement with the *downward-projecting lip of the* retaining member to inhibit movement of the latch member away from the first position *without latching the cover to the container portion of the container*.

2. The container of claim 1, wherein the cover is pivotally connected to a rear side of the container portion *of the container*.

3. The container of claim 1, further comprising a handle located on the container portion *of the container*.

4. The container of claim 1, wherein the latch member comprises a plurality of living hinges.

5. The container of claim 1, wherein the interior space of the container is divided into a plurality of compartments.

6. The container of claim 1, wherein the latch member is attached to the container by a living hinge.

7. The container of claim 1, wherein the latch member *is pivotally connected to the container portion of the container and* comprises:

a cover latching portion constructed and arranged to engage with the cover to latch the cover to the container portion *of the container*; and a container engaging portion constructed and arranged to engage with the container *portion* of the at least one other container.

8. The container of claim 7, wherein the cover latching portion and the container engaging portion are constructed and arranged to be spaced apart such that the cover latching portion and the container engaging portion are positioned to be vertically and/or horizontally misaligned with respect to one another on the latch member.

9. The container of claim 1, wherein the latch member is a first latch member, *the retaining member is a first retaining member,* and the container further comprises*:* a second latch member movable between a [first] *third* position and a [second] *fourth* position[.]*; and*

*a second retaining member, on the container, constructed and arranged to engage with the second latch member,* wherein [in the first position] the second latch member, *when in the third position,* engages the *second* retaining member to inhibit movement of the second latch member away from the [first] *third* position, wherein the second latch member, when in the [second] *fourth* position, is positioned to be able to engage with [a] *the* container portion of the at least one other container to connect the container to the at least one other container, wherein the second latch member is pivotally movable in a clockwise and counterclockwise manner, wherein the second latch member can be pivoted upwards to the [second] *fourth* position to engage the container portion of the at least one other container, and wherein the second latch member can be pivoted downwards to the [first] *third* position to engage the *second* retaining member to inhibit movement of the second latch member away from the [first] *third* position.

10. The container of claim 9, wherein the first and second latch members are located on opposite sides of the container portion *of the container*.

11. The container of claim 10, wherein [in the second position,] the first *latch member engages the cover of the container and the container portion of the at least one other container when the first latch member is in the second position,* and *wherein the* second latch [members each] *member* engages the cover of the container and the container portion of the at least one other container *when the second latch member is in the fourth position*.

12. The container of claim 1, further comprising a cover latch on a front side for latching the cover to the container portion *of the container*.

13. The container of claim 12, wherein the cover latch is separate from the [first and second latch members] *latch member*.

14. The container of claim 12, wherein the cover latch is pivotally connected to the cover and engages a latch engaging element on the container portion *of the container* to lock the cover to the container portion *of the container*.

15. The container of claim 12, wherein the cover latch comprises resilient material and is configured to engage with a latch engaging element on the container portion *of the container* to latch the cover to the container portion *of the container*.

*16. The container of claim 1, wherein the retaining member is located on the container portion of the container.*

*17. The container of claim 1, wherein the latch member is pivotally connected to the container portion of the container.*

*18. The container of claim 1, wherein the latch member comprises:*

*a first segment pivotally connected to the container; and*

*a second segment, connected to the first segment, that: (i) engages the retaining member when the latch member is in the first position; and (ii) is able to engage with the container portion of the at least one other container when the latch member is in the second position.*

*19. The container of claim 1, wherein the retaining member comprises: (i) a portion that protrudes outwardly from the container; and (ii) the downward-projecting lip, extending downward from the outward-protruding portion of the retaining member, to which the latch member engages when the latch member is in the first position.*

*20. The container of claim 1, wherein the retaining member is a first retaining member, and the container further comprises a second retaining member that comprises: (i) a portion that protrudes outwardly from the container; and (ii) a lip portion, extending upward from the outward-protruding portion of the second retaining member, for engagement with a latch member of a further container to latch the further container to the container.*

*21. The container of claim 1, further comprising:*

*removable inner containers for placement in the interior space,*

*wherein the cover comprises an inner ridge portion having a top surface elevated above at least one other top surface of the cover and constructed and arranged such that a bottom surface of the inner ridge portion rests below a level of a top surface of at least one of the removable inner containers when the opening is closed by the cover.*

*22. The container of claim 21, wherein the cover further comprises an outer ridge portion having a top surface elevated above the at least one other top surface of the cover and constructed and arranged such that a bottom surface of the outer ridge portion rests below a level of a top surface of an outer wall of the container portion of the container when the opening is closed by the cover.*

*23. The container of claim 1, further comprising:*

*removable inner containers for placement in the interior space,*

*wherein the cover comprises at least a bottom surface that rests below a level of a top surface of at least one of the removable inner containers when the opening is closed by the cover.*

*24. The container of claim 1, wherein the latch member is located on a first side of the container, and wherein the container further comprises:*

*cover latch members, on a second side of the container, for latching the cover to the container portion of the container; and*

*a carrying handle, on the second side of the container between the cover latch members, that is constructed and arranged such that, when the container is secured to the at least one other container via the engagement of the latch member with the container portion of the at least one other container, the carrying handle is vertically aligned with a carrying handle of the at least one other container.*

*25. The container of claim 1, wherein*

*the latch member includes a latch surface thereon,*

*the retaining member is constructed and arranged to engage the latch surface of the latch member,*

*when the latch member is in the first position, the latch surface is engaged by the retaining member without latching the cover to the container portion of the container,*

*when the latch member is in the second position, the latch surface is positioned to be able to engage with the container portion of the at least one other container to connect the container to the at least one other container,*

*the latch member is pivotable upwards to the second position for engagement by the latch surface with the container portion of the at least one other container, and*

*the latch member is pivotable downwards to the first position so that the latch surface engages the retaining member without latching the cover to the container portion of the container.*

*26. A container constructed and arranged to be connected to at least one other container, the container comprising:*

*a container portion with an opening into an interior space in which articles to be transported can be stored;*

*a cover for closing the opening;*

*a latch member movable between a first position and a second position, wherein the latch member comprises a first segment and a second segment, the first segment is pivotally connected to the container, and the second segment is connected to the first segment; and*

*a retaining member, on the container, constructed and arranged to engage with the latch member,*

*wherein, when the latch member is in the first position, the second segment of the latch member engages the*

*retaining member to inhibit movement of the latch member away from the first position,*

*wherein, when the latch member is in the second position, the second segment of the latch member is positioned to be able to engage with a container portion of the at least one other container to connect the container to the at least one other container,*

*wherein the latch member is pivotally movable in a clockwise and counterclockwise manner between the first and second positions,*

*wherein the latch member is pivotable upwards to the second position for engagement with the container portion of the at least one other container, and*

*wherein the latch member is pivotable downwards to the first position for engagement with the retaining member to inhibit movement of the latch member away from the first position.*

*27. The container of claim 26, wherein the retaining member comprises: (i) a portion that protrudes outwardly from the container; and (ii) a lip portion, extending downward from the outward-protruding portion of the retaining member, to which the second segment of the latch member engages when the latch member is in the first position.*

*28. The container of claim 26, wherein the retaining member is a first retaining member, and the container further comprises a second retaining member that comprises: (i) a portion that protrudes outwardly from the container; and (ii) a lip portion, extending upward from the outward-protruding portion of the second retaining member, for engagement with a latch member of a further container to latch the further container to the container.*

*29. The container of claim 26, further comprising:*

*removable inner containers for placement in the interior space,*

*wherein the cover comprises an inner ridge portion having a top surface elevated above at least one other top surface of the cover and constructed and arranged such that a bottom surface of the inner ridge portion rests below a level of a top surface of at least one of the removable inner containers when the opening is closed by the cover.*

*30. The container of claim 26, wherein the second segment is pivotally movable relative to the first segment.*

*31. The container of claim 26, further comprising:*

*removable inner containers for placement in the interior space,*

*wherein the cover comprises at least a bottom surface that rests below a level of a top surface of at least one of the removable inner containers when the opening is closed by the cover.*

*32. The container of claim 26, wherein the latch member is located on a first side of the container, and wherein the container further comprises:*

*cover latch members, on a second side of the container, for latching the cover to the container portion of the container; and*

*a carrying handle, on the second side of the container between the cover latch members, that is constructed and arranged such that, when the container is secured to the at least one other container via the engagement of the second segment of the latch member with the container portion of the at least one other container, the carrying handle is vertically aligned with a carrying handle of the at least one other container.*

*33. A container constructed and arranged to be connected to at least one other container, the container comprising:*

*a container portion with an opening into an interior space in which articles to be transported can be stored;*

*a cover for closing the opening;*

*a latch member movable between a first position and a second position, the latch member including a latch surface thereon; and*

*a receiving portion, on the container, constructed and arranged to engage the latch surface of the latch member,*

*wherein when the latch member is in the first position, the latch surface is engaged by the receiving portion without latching the cover to the container portion of the container,*

*wherein when the latch member is in the second position, the latch surface is positioned to be able to engage with a container portion of the at least one other container to connect the container to the at least one other container,*

*wherein the latch member is pivotally movable in a clockwise and counterclockwise manner between the first and second positions,*

*wherein the latch member is pivotable upwards to the second position for engagement by the latch surface with the container portion of the at least one other container,*

*wherein the latch member is pivotable downwards to the first position so that the latch surface engages the receiving portion without latching the cover to the container portion of the container, and*

*wherein the receiving portion comprises: (i) a portion that protrudes outwardly from the container; and (ii) a lip portion, extending downward from the outward-protruding portion of the receiving portion, to which the latch member engages when the latch member is in the first position.*

*34. The container of claim 33, wherein the receiving portion is a first receiving portion, and the container further comprises a second receiving portion that comprises: (i) a portion that protrudes outwardly from the container; and (ii) a lip portion, extending upward from the outward-protruding portion of the second receiving member, for engagement with a latch member of a further container to latch the further container to the container.*

*35. The container of claim 33, further comprising:*

*removable inner containers for placement in the interior space,*

*wherein the cover comprises an inner ridge portion having a top surface elevated above at least one other top surface of the cover and constructed and arranged such that a bottom surface of the inner ridge portion rests below a level of a top surface of at least one of the removable inner containers when the opening is closed by the cover.*

*36. The container of claim 35, wherein the cover further comprises an outer ridge portion having a top surface elevated above the at least one other top surface of the cover and constructed and arranged such that a bottom surface of the outer ridge portion rests below a level of a top surface of an outer wall of the container portion of the container when the opening is closed by the cover.*

*37. The container of claim 33, further comprising:*

*removable inner containers for placement in the interior space,*

*wherein the cover comprises at least a bottom surface that rests below a level of a top surface of at least one of the removable inner containers when the opening is closed by the cover.*

*38. The container of claim 33, wherein the latch member is located on a first side of the container, and wherein the container further comprises:*

*cover latch members, on a second side of the container, for latching the cover to the container portion of the container; and*

*a carrying handle, on the second side of the container between the cover latch members, that is constructed and arranged such that, when the container is secured to the at least one other container via the engagement of the latch member with the container portion of the at least one other container, the carrying handle is vertically aligned with a carrying handle of the at least one other container.*

* * * * *